(12) United States Patent
Zhang et al.

(10) Patent No.: US 7,808,921 B2
(45) Date of Patent: Oct. 5, 2010

(54) BRIDGING CENTRALITY: A CONCEPT AND FORMULA TO IDENTIFY BRIDGING NODES IN SCALE-FREE NETWORKS

(75) Inventors: Aidong Zhang, Getzville, NY (US); Murali Ramanathan, Amherst, NY (US); Woo-Chang Hwang, Tonawanda, NY (US); Young-Rae Cho, Williamsville, NY (US)

(73) Assignee: The Research Foundation of State University of New York, Amherst, NY (US)

( * ) Notice: Subject to any disclaimer, the term of this patent is extended or adjusted under 35 U.S.C. 154(b) by 741 days.

(21) Appl. No.: 11/804,700

(22) Filed: May 18, 2007

(65) Prior Publication Data

US 2007/0286218 A1 Dec. 13, 2007

Related U.S. Application Data

(60) Provisional application No. 60/802,228, filed on May 19, 2006.

(51) Int. Cl.
H04L 12/26 (2006.01)
H04L 12/28 (2006.01)
(52) U.S. Cl. .................................................. 370/252
(58) Field of Classification Search ................ 370/401, 370/389, 338, 254, 329, 350, 336, 252, 352, 370/400; 382/181; 709/223, 224; 455/507
See application file for complete search history.

(56) References Cited

U.S. PATENT DOCUMENTS

| 6,952,688 | B1 * | 10/2005 | Goldman et al. | 706/45 |
| 7,539,175 | B2 * | 5/2009 | White et al. | 370/350 |
| 2007/0086361 | A1 * | 4/2007 | Allan et al. | 370/254 |
| 2007/0298821 | A1 * | 12/2007 | Bush | 455/507 |

OTHER PUBLICATIONS

R. Albert, H. Joeng, and A. L. Barabasi, "Error and Attack Tolerance of Complex Networks", Nature, 406:378{381, Jul. 2000.
E. Alm and A. P. Arkin, "Biological Networks", Current opinion in Structural Biology, 13: 193{202, 2003.

(Continued)

*Primary Examiner*—Pankaj Kumar
*Assistant Examiner*—Prenell P Jones
(74) *Attorney, Agent, or Firm*—Simpson & Simpson, PLLC

(57) ABSTRACT

A method for identifying a bridge node in a network using a processor and memory unit in a specially programmed special purpose-purpose computer including the steps of, for each node in a plurality of nodes in the network: determining a global metric proportional to total traffic flow in the network and through the node; determining a local metric proportional to traffic flow between the node and each second node in the network connected to the node and traffic flow between each second node and each third node in the network connected to a second node; determining a second local metric proportional to the respective traffic flows between each node and each second node; and calculating a respective combination of the global metric and the first and second local metrics; and selecting, a bridge node from among the plurality of nodes based on the respective combinations.

16 Claims, 11 Drawing Sheets

OTHER PUBLICATIONS

A. L. Barabasi and E. Bonabeau, "Scale-Free Networks", Scientific American, 60{69, May 2003.

A. L. Barabasi and Z. N. Oltvai "Network Biology: Understanding The Cell's Functional Organization", Nature Reviews: Genetics, 5:101{113, Feb. 2004.

P. Bonacich, "Power and Centrality: A Family of Measures", American Journal of Sociology, 92:1170{1182, 1987.

S. Brin and L. Page, "The Anatomy of a Large-Scale Hypertextual Web Search Engine", Computer Networks and ISDN Systems, 30:107{117, 1998.

E. Estrada, "Virtual Identification of Essential Proteins Within the Protein Interaction Network of Yeast", Proteomics, 6(1):35{40, Jan. 2006.

E. Estrada and J. A.Rodiguez-Velazquez, "Subgraph centrality in complex networks", Physical Review, 71(5):056103, 2005.

L. C. Freeman, "A set of measures of centrality based on betweenness", Sociometry, 40:35{41, 1979.

R. Guimera and L. A. N. Amaral, "Functional cartography of complex metabolic networks", Nature, 433:895{900, Feb. 2005.

M. W. Hahn and A. D. Kern, "Comparative genomics of centrality and essentiality in three eukaryotic protein-interaction networks", Molecular Biology and Evolution, 22(4):803{806, 2005.

J. Hallinan, "Cluster analysis of the p53 genetic regulatory network: Topology and biology", 2004 IEEE Symposium on Computational Intelligence in Bioinformatics and Computational Biology, Oct. 2004.

H. Jeong, S. P. Manson, A. L. Barabasi, and Z. N. Oltvai, "Lethality and centrality in protein networks", Nature, 411:41{42, May 2001.

M. E. J. Newman, "Finding and evaluating community structure in networks", arXiv:cond-mat, 1:0308217, Aug. 2003.

M. E. J. Newman, "A measure of betweenness centrality based on random walks", arXiv:cond-mat, 1:0309045, Sep. 2003.

M. C. Palumbo, A. Colosimo, A. Giuliani, and L. Farina, "Functional essentiality from topology features in metabolic networks: a case study in yeast", Federation of European Biochemical Societies Letters, 579:4642{4646, 2005.

D. J. Watts and S. H. Strogatz, "Collective dynamics of small world networks", Nature, 393:440{442, Jun. 1998.

A.-L. Barabasi and R. Albert, "Emergence of scaling in random networks", Science, 286:509{511 (1999).

U. Brandes, "A faster algorithm for betweenness centrality", Journal of Mathematical Sociology, 25(2):163-177 (2001).

D. Bu, et al., "Topological structure analysis of the protein-protein interaction network in budding yeast", Nucleic Acid Research, 31(9):2443-2450 (2003).

C. M. Deane, L. Salwinski, I. Xenarios and D. Eisenberg, "Protein interactions: two methods for assessment of the reliability of high throughput observation", Molecular and Cellular Proteomics, 1.5:349-356 (2002).

A.-C. Gavin, et al. "Functional organization of the yeast proteome by systematic analysis of protein complexes", Nature, 415:141-147(2002).

M. Girvan and M. E. J. Newman, "Community structure in social and biological networks", PNAS, 99(12):7821-7826 (2002).

L. H. Hartwell J. J. Hopfield, S. Leibler and A. W. Murray, "From molecular to modular cell biology", Nature, 402:c47-c52 (1999).

V. Ho, et al., "Systematic identification of protein complexes in *Saccharomyces cerevisiae* by mass spectrometry", Nature, 415:180-183 (2002).

P. Holme, M. Huss and H. Jeong, "Subnetwork hierarchies of biochemical pathways", Bioinformatics, 19(4):532-538 (2003).

T. Ito, et al., "A comprehensive two-hybrid analysis to explore the yeast protein interactome", PNAS, 98(8):4569-4574 (2001).

H. Jeong, B. Tombor, R. Albert, Z. N. Oltvai and A.-L. Barabasi, "The large-scale organization of metabolic networks", Nature, 407:651-654 (2000).

A. D. King, N. Przulj and I. Jurisica, "Protein complex prediction via cost-based clustering", Bioinformatics, 20(17):3013-3020 (2004).

S. Maslov and K. Sneppen, "Specificity and stability in topology of protein networks", Science, 296:910-913 (2002).

H. W. Mewes, et al., "MIPS: analysis and annotation of proteins from whole genomes", Nucleic Acids Research, 32:D41-D44 (2004).

M. E. J. Newman, "Scientific collaboration networks: II. Shortest paths, weighted networks, and centrality", Physical Review E, 64:016132 (2001).

E. Ravasz, A. L. Somera, D. A. Mongru, Z. N. Oltvai and A.-L. Barabasi, "Hierarchical organization of modularity in metabolic networks", Science, 297:1551-1555 (2002).

A. Ruepp, et al., "The FunCat, a functional annotation scheme for systematic classification of proteins from whole genomes", Nucleic Acids Research, 32(18):5539-5545 (2004).

L. Salwinski, et al., "The database of interacting proteins: 2004 update", Nucleic Acid Research, 32:D449-D451 (2004).

V. Spirin and L. A. Mirny, "Protein complexes and functional modules in molecular networks", PNAS, 100(21):12123-12128 (2003).

P. Uetz, et al., "A comprehensive analysis of protein-protein interactions in *Saccharomyces cerevisiae*", Nature, 403:623-627 (2000).

\* cited by examiner

BRIDGING CENTRALITY: A CONCEPT AND FORMULA TO IDENTIFY BRIDGING NODES IN SCALE-FREE NETWORKS

CROSS-REFERENCE TO RELATED APPLICATIONS

This patent application claims the benefit under 35 U.S.C. §119(e) of U.S. Provisional Application No. 60/802,228, filed May 19, 2006, which application is incorporated herein by reference.

STATEMENT REGARDING FEDERALLY SPONSORED RESEARCH AND DEVELOPMENT

The U.S. Government has a paid-up license in this invention and the right in limited circumstances to require the patent owner to license others on reasonable terms as provided for by the terms of Grant No. 1 P20 GM067650-01A1 awarded by the National Institutes of Health (NIH).

FIELD OF THE INVENTION

The present invention generally relates to identifying nodes in a network that are important for traffic flow in the network. In particular, the present invention relates to identifying bridging nodes that combine high global and local importance with respect to traffic flow in the network.

BACKGROUND OF THE INVENTION

Many real world systems, e.g., internet, World Wide Web (WWW), social systems, biological systems, etc., can be described as complex networks, which are structured as a set of nodes and a set of edges connecting the nodes. Scale-free network is the most popular and emerging form of network in these real world network systems. Most of these real world networks have been proved to follow some topological statistical features, i.e., features of scale-free network, such as power law degree distribution, small world property, and high modularity. Power law degree distribution depicts the probability of finding a highly connected node decreases exponentially with its own degree, which is the number of edges incident on the node. In other words, there are many low degree nodes, and only a small number of nodes have high degree. The second phenomenon, small world property, describes that the average distance between nodes in a network is relatively shorter than other network types, e.g., random networks of the same size. Namely, any node can be reached within small number of consecutive edges from a node in a network. A module refers to a densely connected, functionally or physically, group of nodes in a network. For the last distinct and the most interesting property, these real world networks have high modularity which indicates that high clustering is one of dominating characteristics of these networks.

Over the past few years, empirical and theoretical studies of networks have been one of the most popular subjects of recent research in many areas including technological, social, and biological fields. Network theories have been applied with good success to these real world systems, and many centrality indices, measurements of the importance of the components in a network, have been introduced. While these centrality indices have proved that they made outstanding achievements in the analysis and understanding of the roles of nodes in a network, the majority of these existing centrality indices focus only on the extent how much nodes are well located on central positions or play central roles from the stand point of topology and information flow. These existing centrality measures can not help being considerably dominated by the nodes' degree due to their nature of the computing components' importance. Even though these approaches are very good at identifying central components, i.e., central components from any centrality viewpoint, of a network or of a module, they concentrate only on central components and overlook other essential topological aspects in networks.

In this research, the focus of the network analysis is moved from the directions of identifying central nodes to another entirely new, fresh, and important direction. From our deeper observation of the high modularity property of scale free networks, we claim that there should be "bridging" nodes that are located between modules, and we found that there exist "bridging" nodes in real world scale-free networks due to their high modularity phenomenon. So, we also claim that these bridging nodes, which bridge densely connected regions, should be attractive and important essential components in a network. We introduce a novel centrality metric, bridging centrality that successfully identifies the bridging nodes located between densely connected regions, i.e., modules, using a high modularity or high clustering property which is one of the most important properties of scale-free networks. Experiments on several real world network systems are performed to demonstrate the effectiveness of our metric.

Bridging centrality has many potential applications in several areas. First, it can be used to break up modules in a network for clustering purpose. Functional modules or physical modules in biological networks or sub community structures in social and technological networks can be detected using the bridging nodes chosen by bridging centrality. Second, it also can be used to identify the most critical points interrupting the information flow in a network for network protection and robustness improvement purposes for networks. Third, in biological applications, the bridging centrality can be used to locate key proteins, which are the connecting nodes among functional modules.

SUMMARY OF THE INVENTION

The present invention broadly comprises a method for identifying a bridge node in a network, including the steps of: determining, for each first node in a plurality of nodes in the network, using a processor in a specially programmed special purpose-purpose computer, a global metric proportional to total traffic flow in the network and traffic flow through each first node; determining, for each first node using the processor, a first local metric proportional to traffic flow between each first node and each second node in the network connected to the first node and traffic flow between each second node and each third node in the network connected to at least one of the second nodes, determining, for each first node using the processor, a second local metric proportional to the largest and second largest traffic flows from among the respective traffic flows between each first node and each second node; calculating, for each first node using the processor and a memory element in the general-purpose computer, a combination of the global metric and the first and second local metrics; and selecting, using the processor and the memory element, a bridge node from among the plurality of nodes based on the combinations.

In some aspects, the global metric includes the traffic flow through each first node divided by the total traffic flow, a denominator for the first focal metric includes the traffic flow between each first node and each second node, the second local metric includes the second largest traffic flow divided by the largest traffic flow, calculating a respective combination includes calculating a respective product of the global metric and the first and second local metrics for each first node, and selecting a bridge node includes selecting a first node with a highest respective product.

The present invention also broadly comprises a method for identifying a bridge node in a network, including the steps of: determining, for each first node in the network, using a processor in a specially programmed special purpose-purpose computer, a global metric proportional to total traffic flow in the network and traffic flow through each first node; determining, for each first node using the processor, a local metric proportional to traffic between each first node and each second node in the network connected to the first node; calculating, for each first node using the processor and a memory element in the general-purpose computer, a combination of the global metric and the local metric; and selecting, using the processor and the memory element, a bridge node from among the plurality of nodes based on the combinations.

In some aspects, determining a local metric comprises: determining, for each first node using the processor, a first local sub-metric proportional to the traffic flow between each first node and each second node and traffic flow between each second node and each third node in the network connected to at least one of the each second node; and determining, for each first node using the processor, a second local sub-metric proportional to the largest and second largest traffic flows from among the respective traffic flows between each first node and each second node. In some aspects, the global metric includes the traffic flow through each first node divided by the total traffic flow, a denominator for the first local, sub-metric includes the traffic flow between each first node and each second node, the second local metric includes the second largest traffic flow divided by the largest traffic flow, calculating a respective combination includes calculating a respective product of the global metric and the first and second local sub-metrics for each first node, and selecting a bridge node includes selecting first node with a highest respective product.

The present invention further broadly comprises a method for identifying a bridge node in a network, including the steps of: determining, for each first node in the network, using a processor in a specially programmed special purpose-purpose computer, a global metric proportional to a total number of paths connecting node pairs in said network and a total number of said paths connected to said each first node; determining, for each first node using the processor, a local metric proportional to traffic between each first node and each second node in the network connected to each first node; calculating, for each first node using the processor and a memory element in the general-purpose computer, a combination of the global metric and the local metric; and selecting, using the processor and the memory element, a bridge node from among the plurality of nodes based on the combinations.

In some aspects, determining a local metric comprises: determining, for each first node using the processor, a first local sub-metric proportional to the traffic flow between each first node and each second node and traffic flow between each second node and each third node in the network connected to at least one of the each second node; and determining, for each first node using the processor, a second local sub-metric proportional to the largest and second largest traffic flows from among the respective traffic flows between each first node and each second node. In some aspects, the global metric includes the total number of the paths connected to each first node divided by the total number of the paths connecting node pairs in the network, a denominator for the first local sub-metric includes the traffic flow between each first node and each second node, the second local metric includes the second largest traffic flow divided by the largest traffic flow, calculating a respective combination includes calculating a respective product of the global metric and the first and second local sub-metrics for each first node, and selecting a bridge node includes selecting the first node with a highest respective product.

The present invention also broadly comprises an apparatus for identifying a bridge node in a network.

It is an object of the present invention to provide a method and system for identifying bridging nodes in a network.

It is an object of the present invention to provide a method and system for identifying nodes capable of disrupting traffic flow in a network while maintaining structural integrity of the network.

DETAILED DESCRIPTION OF THE INVENTION

Terminology and Representation

Real world systems can be represented using graph theoretic methods. The approach presented focuses on undirected graphs. An undirected graph G=(V, E) consists of a set V of nodes or vertices and a set E of edges, $E \subseteq V \times V$. An edge e(i,j) connects two nodes i and j, e(i,j)$\in$E.

An undirected graph G={(V, E)| V is a set of nodes and E is a set of edges, $E \subseteq V \times V$, an edge e=(i,j) connects two nodes i and j, i, j$\in$V, e$\in$E}. We investigated several diverse networks ranging from simulated data, social and biological networks to the Internet and the Worldwide Web. In the biological examples, the nodes in the biological network's graph representation are the various biomolecular species whose composition can range from biopolymers such as proteins, DNA, RNA to small molecules such as lipids, sugars and metabolites. The edges between the nodes represent an interaction between the underlying molecular species. Likewise, in the social networks, the nodes represent individuals and the edges are social or collaborative relationships. For the Internet and World Wide Web, the nodes are computers/devices and Web pages, respectively; the edges represent network connectivity and links, respectively. Such undirected graphs have been widely employed in network modeling of these systems.

Network Properties

The neighbors N(v) of node v are defined to be the set of directly connected nodes to node v. The degree d(v) of a node v is the number of the nodes directly connected to node v, i.e., cardinality of N(v). A path is defined as a sequence of nodes $(n_1, \ldots, n_k)$ such that from each of its nodes there is an edge to the successor node. The path length is the number of edges in its node sequence. A shortest path between two nodes, i and j, is a minimal length path between them. The distance between two nodes, i and j, is the length of its shortest path. The clustering coefficient, $C_v$, of node v measures the extent of the inter-connectivity between the neighbors of node v and is the ratio of the number of edges between the nodes in the direct neighborhood to the number of edges that could possibly exist among them:

$$C_v = \frac{2\left|\bigcup_{i,j \in N(v)} e(i,j)\right|}{d(v)(d(v)-1)} : e(i,j) \in E \quad (1)$$

The clustering coefficient of a graph is the average of the clustering coefficients of all nodes in the graph.

Figure 1:
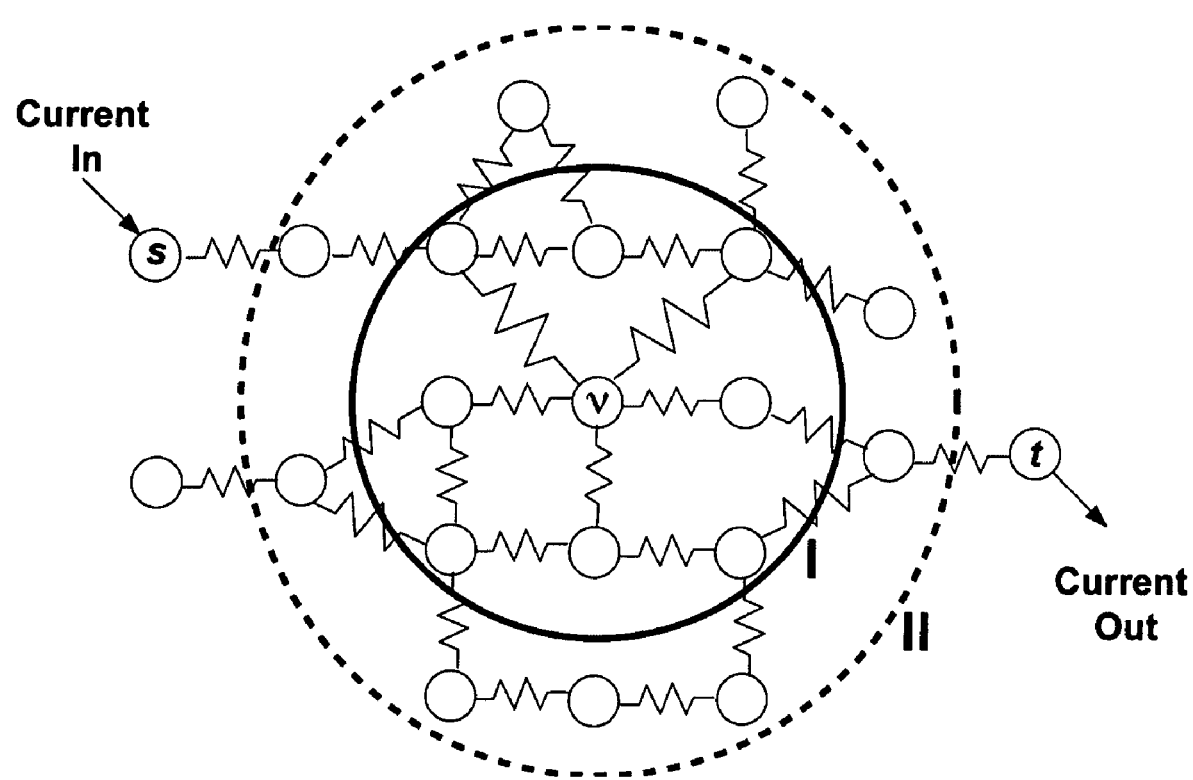
FIG. 1 is an electrical network model.

The first neighbor subgraph $S_1(v)=\{(V_1,E_1)|V_1$ is the set of nodes in the direct neighbors of node v, $E_1$ is the set of edges, $E_1 \subseteq V_1 \times V_1$, an edge $e=(i,j)$ connects two nodes i and j, i, $j \in V_1$, $e \in E_1\}$, the subgraph I in FIG. 1. The second neighbor subgraph of node v is $S_2(v)=\{(V_2,E_2)|V_2$ is the set of nodes that are located within distance 2 from node v, $E_2$ is the set of edges, $E_2 \subseteq V_2 \times V_2$, an edge $e=(i,j)$ connects two nodes i and j, i, $j \in V_2$, $e \in E_2\}$, the subgraph II in FIG. 1 which includes the direct neighbors and the neighbors of the direct neighbors of node v. All network figures were initially obtained using Pajek (Batagelj, V. & Mrvar, A.)

Bridging Centrality

We define a bridging node to be a node connecting modular regions in a graph. We here introduce a formula, termed bridging centrality, to quantitatively measure the degree of bridging capability of all nodes in the network. The bridging nodes in a graph can then be identified on the basis of their high value of bridging centrality relative to other nodes on the same graph. To calculate the bridging centrality, we employed a network flow model and computational approach derived from electrical network theory Newman, M. E. & Girvan, M. Finding and evaluating community structure in networks (Phys Rev E Stat Nonlin Soft Matter Phys 69, 026113 (2004)). Each edge was treated as a unit resistor and the signal flow of node v is defined as the accumulated current flow through node v between all source-sink pairs in network G.

Definition 1: $\psi(G,v)$ is the signal flow through node v between all current source and sink pairs in network G:

$$\Psi(G,v) = \sum_{s \neq t \in G} I_{st}(v) \quad (1)$$

where $I_{st}(v)$ is the current flow through node v between a unit current source node s and current sink t.

Definition 2: $\psi_{max}(G,v)$ and $\psi_{second}(G,v)$ are the highest signal flow quantity and the second highest signal flows, respectively, in the direct neighbors of node v:

$$\Psi_{max}(G,v)=\text{Max}(\Psi(G,i)), i \in N(v) \quad (2)$$

$$\Psi_{second}(G,v)=\text{Second}(\Psi(G,i)), i \in N(v) \quad (3)$$

Definition 3 The bridging centrality $C_R(v)$ is defined by:

$$C_R(v) = \Psi(G,v)\left(\frac{\Psi_{second}(G,v)}{\Psi_{max}(G,v)}\right)\left(\frac{\Psi(S_2(v),v) - \Psi(S_1(v),v)}{\Psi(S_1(v),v)}\right) \quad (4)$$

$\psi(S_1(v),v)$ measures the signal flow of node v in the first neighbor subgraph $S_1(v)$ and $\psi(S_2(v),v)$ measures the signal flow of node v in the second neighbor subgraph $S_2(v)$. The $\psi_{max}(G,v)$ and $\psi_{second}(G,v)$ are the maximum signal flow value and the second highest signal flow value, respectively, in the direct neighbors of node v.

Thus, bridging centrality of a node is the product of the three terms (Equation (4)) that enable it to assess bridging. The first term, which measures global importance of the node, represents the fraction of all pairwise network signal flows that pass through the node. The second term measures the fraction of the signal that can be transmitted across the bridge from the two 'busiest' neighboring regions. The third term assesses the importance of the bridge to the local neighborhood: it assesses the signal congestion at the bridge. A bridging node is a node v that has high bridging centrality value.

Figure 2:
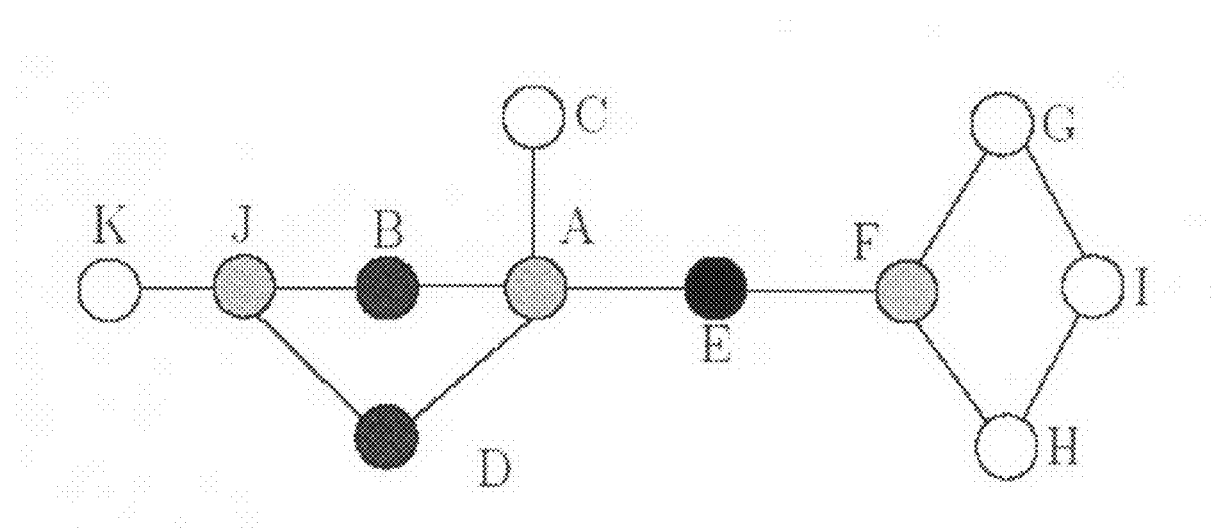
FIG. 2 illustrates a small synthetic network example.

FIG. 2 and Table 1 (herebelow) clearly illustrate the essence of bridging centrality. The top six high bridging score nodes are colored. Although node A has the highest degree and betweenness value, nodes E, B, and D have much higher bridging centrality values since node A is located on the center of a module and not on a bridge, which results in the lowest bridging coefficient value. In other words, a far higher number of shortest paths go through node A than the other three nodes, but nodes E, B, and D position on bridges much better. So, nodes E, B, and D have higher bridging centrality values since they are on the bridges between modules which leads much higher bridging coefficient values than node A. Betweenness centrality decides only the extent of how important the node of interest is from information flow standpoint, and it does not consider the topological location of the node. On the other hand, nodes B and D have the same bridging coefficient value with node E, but nodes B and D have much less betweenness centrality values since far more number of shortest paths passes through node E than through nodes B and D. Even though nodes E, B, and D are located on similar local topological positions, i.e., similar local topological surroundings, node E is taking a much more important location than nodes B and D in the information flow viewpoint. Bridging coefficient measures only the extent of how well the node is located between highly connected regions, and it does not deliberate the node's importance from information flow standpoint. Without a doubt, it can be figured out that node E is taking a better bridging position than nodes B and D are in FIG. 2.

Bridging nodes should be positioned between modules and also located on important positions in information flow standpoint. So, bridging centrality combines these two measurements, betweenness centrality and bridging coefficient, since none of these two indices can differentiate the bridging nodes alone, as we saw in the above. So bridging centrality combines global and local features, betweenness centrality and bridging coefficient respectively, of the node not focusing only on one topological factor like other centrality indices do, and discriminates the bridging nodes which are located on the critical positions for information flow viewpoint and also are positioned on the bridges.

TABLE 1

Top six centrality values of FIG. 2, including Degree, Betweenness ($C_B$), and bridging centrality ($C_R$).

| Node | Degree | $C_B$ | $C_R$ |
|---|---|---|---|
| E | 2 | 0.013737 | 0.076573 |
| B | 2 | 0.007778 | 0.010674 |
| D | 2 | 0.007778 | 0.010674 |
| A | 4 | 0.016364 | 0.007412 |
| J | 3 | 0.009293 | 0.003098 |
| F | 4 | 0.013030 | 0.003066 |

Results

The focus of this research and performance analysis is mainly on the top 25% bridging centrality score components in all examples because their significance and interest are rapidly reduced below the top 25%. Furthermore, bridging centrality values and the range of the bridging nodes can be arbitrary according to the network topology dealt with. Empirical studies on several real world network systems have led to defining "bridging nodes" as the top 25%.

Application on Simulated Data

Figure 3:
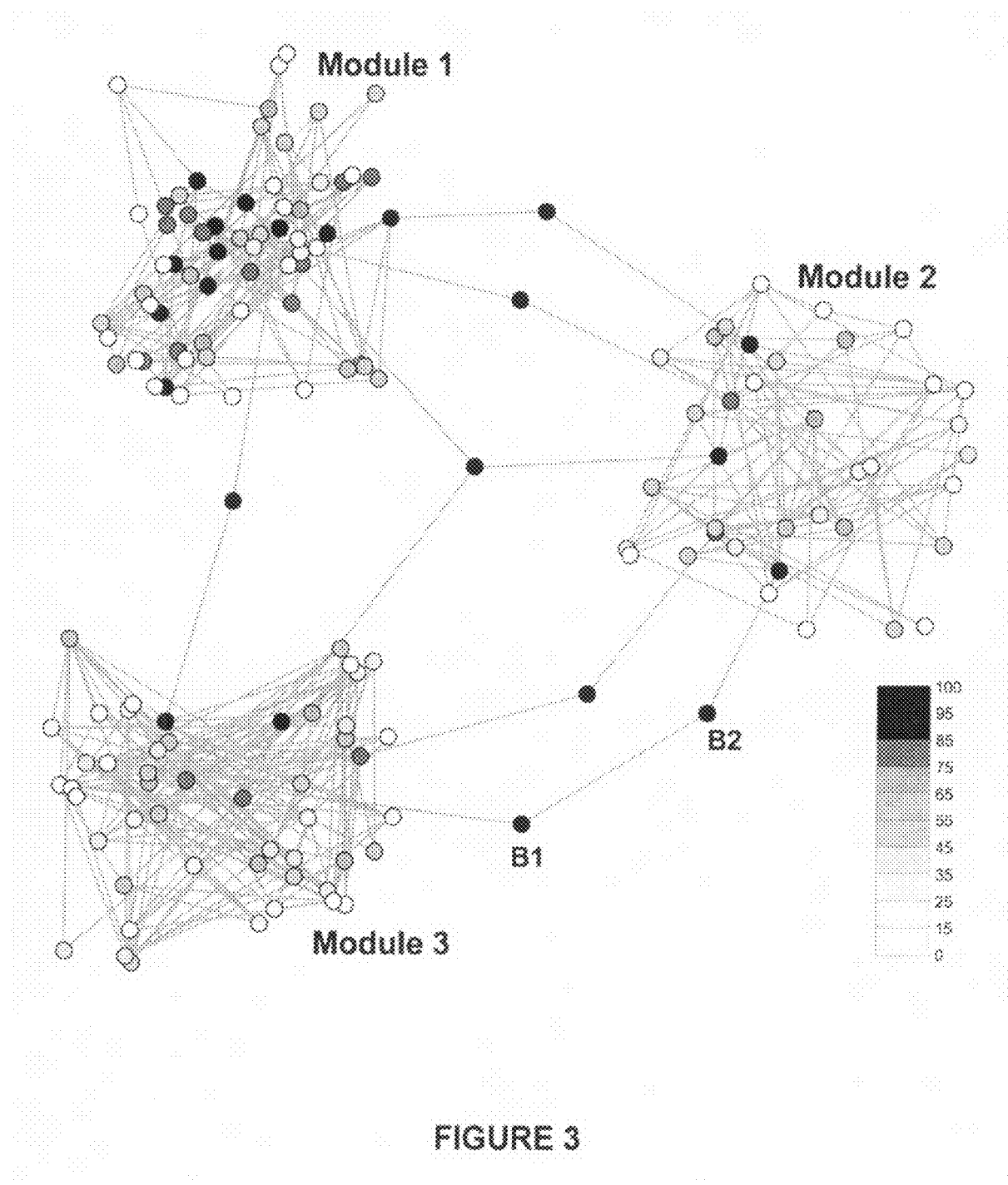
FIG. 3 shows results for the use of a present method or apparatus on a synthetic network consisting of 158 nodes and 362 edges.

To obtain a preliminary assessment of the underlying network characteristics identified by Bridging Centrality, we applied the metric to a synthetic network consisting of 158 nodes and 362 edges shown in FIG. 3. The network was created by joining 3 separate synthetic networks contains key elements such as hub nodes, peripheral nodes, cycles with known bridges. The overall size was kept small so that the any patterns present could be easily detected by visual inspection. In FIG. 3, we have highlighted the nodes with the highest 0-5$^{th}$ percentile of values for the Bridging Centrality are highlighted in red circles; the nodes with the lowest values of Bridging Centrality are the 85$^{th}$-100$^{th}$ percentiles are highlighted in white circles. The color map for the percentile values is shown in the Figure. Visual inspection of the synthetic network reveals that the highest values of Bridging Centrality occur in the nodes that connect the modules and highly connected parts of the network. Upon closer inspection, it was found that the two known bridging nodes, B1 and B2, connecting Modules 2 and 3 were in the 8$^{th}$ and 10$^{th}$ percentiles of Bridging Centrality. The existence of an alternative shorter major bridge between Modules 2 and 3 pushed these two secondary bridges out of top 5$^{th}$ percentile. Two unknown bridging nodes emerged within Module 1: these were located between highly modular sub regions of Module 1 and found on inspection to be effective local bridges.

Application on the p53 Network

In the next step, we extended the promising results obtained to graph model of the p53 network. The p53 protein is a critical tumor suppressor molecule and because it is often mutated in many human tumors, its interactions could potentially provide targets for anti-cancer drugs.

Next, we assessed the biological characteristics and drugability of EIF4E, MDM2, SOS, GRB2, H-Ras, N-Ras, CDK6 and TGFB1, which were identified as having the highest Bridging Centrality values in the p53 network. The EIF4E gene codes for a translation initiation factor and has been directly implicated in the action of rapamycin, the potent immunosuppressant and potential anti-neoplastic agent {Sun, 2005 #31; Wendel, 2004 #32; Huang, 2003 #33}. The levels of EIF4E are a surrogate marker for relapse of head and neck squamous cell cancers {Nathan, 2001 #41; Nathan, 1997 #43} and antisense RNA targeting of EIF4E has been shown to reduce tumorigenic potential {DeFatta, 2000 #34}. Ribavirin and its derivatives bind to EIF4E and inhibit its ability to bind 7-methyl guanosine cap at the 5' end of mRNAs of oncogenes, such as cyclin D1, VEGF and ornithine decarboxylase {Kentsis, 2004 #84}. Ribavirin has been shown to be specific, non-toxic and non-mutagenic {Kentsis, 2004 #84}.

Several drug candidates including, 2,5-bis(5-hydroxymethyl-2-thienyl) furan and the nutlins block the p53-MDM2 binding cleft, and subsequently interrupts the ability of MDM2 to suppress the tumor suppressor activity of p53, {Vassilev, 2004 #82; Issaeva, 2004 #83}. The nutlin inhibitors induce apoptosis in samples chronic lymphocytic leukemia and myeloma patients {Kojima, 2006 #78; Coll-Mulet, 2006 #80; Stuhmer, 2006 #81}. The non-leukemic cells showed lower sensitivity to nutlin-induced apoptosis {Coll-Mulet, 2006 #80}.

The GRB2 gene product is known to be a signal transducer for several oncogenes. It is an adaptor protein that interacts with the Bcr portion of the Bcr-Abl fusion protein, which is produced as a result of the chromosomal translocation in myelogenous leukemia {Feller, 2003 #22}. Blockade of GRB2 binding to SoS (a GDP releasing protein) abrogates the activation of the Ras, a major driving force of the central mitogenic (MAP kinase) pathway.

H-Ras and N-Ras are isoforms of the Ras oncogene and the anti-cholesterol agent, simvastatin, down-regulates H-ras and RNA interference of N-ras inhibits cell growth in small cell lung cancers {Khanzada, 2006 #44}; H-ras over-expression confers resistance to the anti-cancer drugs, bleomycin, cisplatin and adriamycin {Hamamoto, 2005 #45; Youn, 2004 #47}.

The indole-3-carbinols, (which are formed as a result of the metabolism of phytochemicals present in cruciferous vegetables) cause G1 cell cycle arrest and exert strong antiproliferative actions in cancer cell lines that are mediated by decreased CDK6 expression {Brandi, 2003 #26; Firestone, 2003 #27; Chinni, 2001 #29}.

TGFB1 knockout mice result in prenatal lethality, due to improper endothelial differentiation and haematopoiesis {Dickson, 1995 #85}. The natural inhibitor decorin {Yamaguchi, 1990 #86} and the chimeric Fc TGβRII {Muraoka, 2002 #87} have been used successfully studied in animal model of tumors.

Application on the Yeast Metabolic Network

Figure 4:
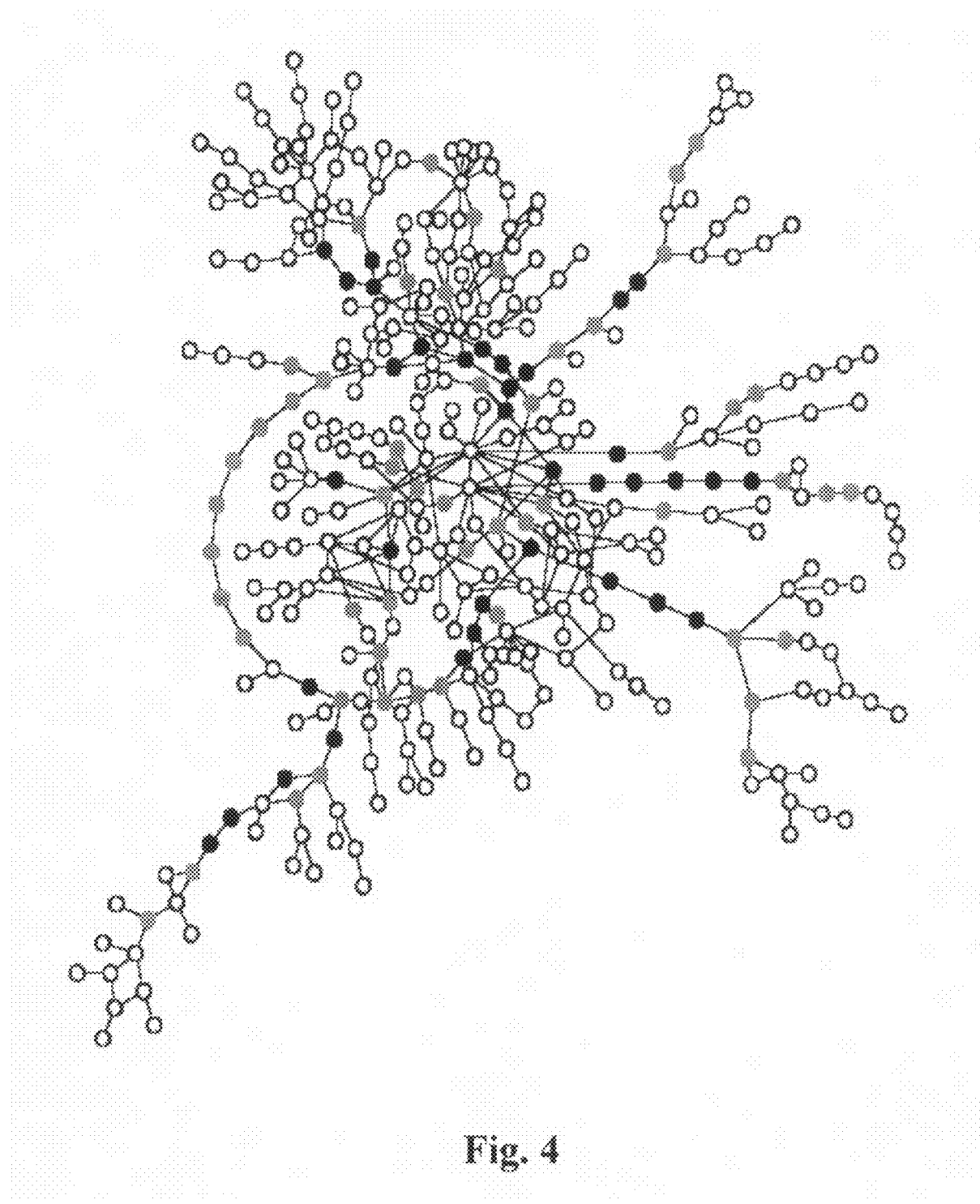
FIG. 4 illustrates a yeast metabolic network with 359 nodes and 435 edges.

In the next step, the promising results obtained with the simple p53 regulatory network model were extended to the undirected yeast metabolic network. The yeast metabolic network is relatively well modularized and clustered according to their cellular functions. FIG. 4 shows that bridging centrality successfully identifies the bridging nodes and the nodes lying on the borders of modules. The nodes with the highest 0-10th percentile of values for the bridging centrality are highlighted in black circles; the nodes with the 10th-25th percentiles of bridging centrality are highlighted in gray circles. Importantly, the majority of its key bridging nodes can be readily identified by visual inspection.

Application on Social Networks

Networks are commonly used to represent social systems and the analysis of these social networks is important in national security applications. Social networks are distinctively different from computer and biological networks in their clustering properties and show positive correlations between degrees of adjacent nodes Newman, M. E. & Park, J. Why social networks are different from other types of networks (Phys Rev E Stat Nonlin Soft Matter Phys 68, 036122 (2003)). We analyzed two social networks to demonstrate that bridging centrality can be used to identify key bridging individuals in a social community.

Figure 5:
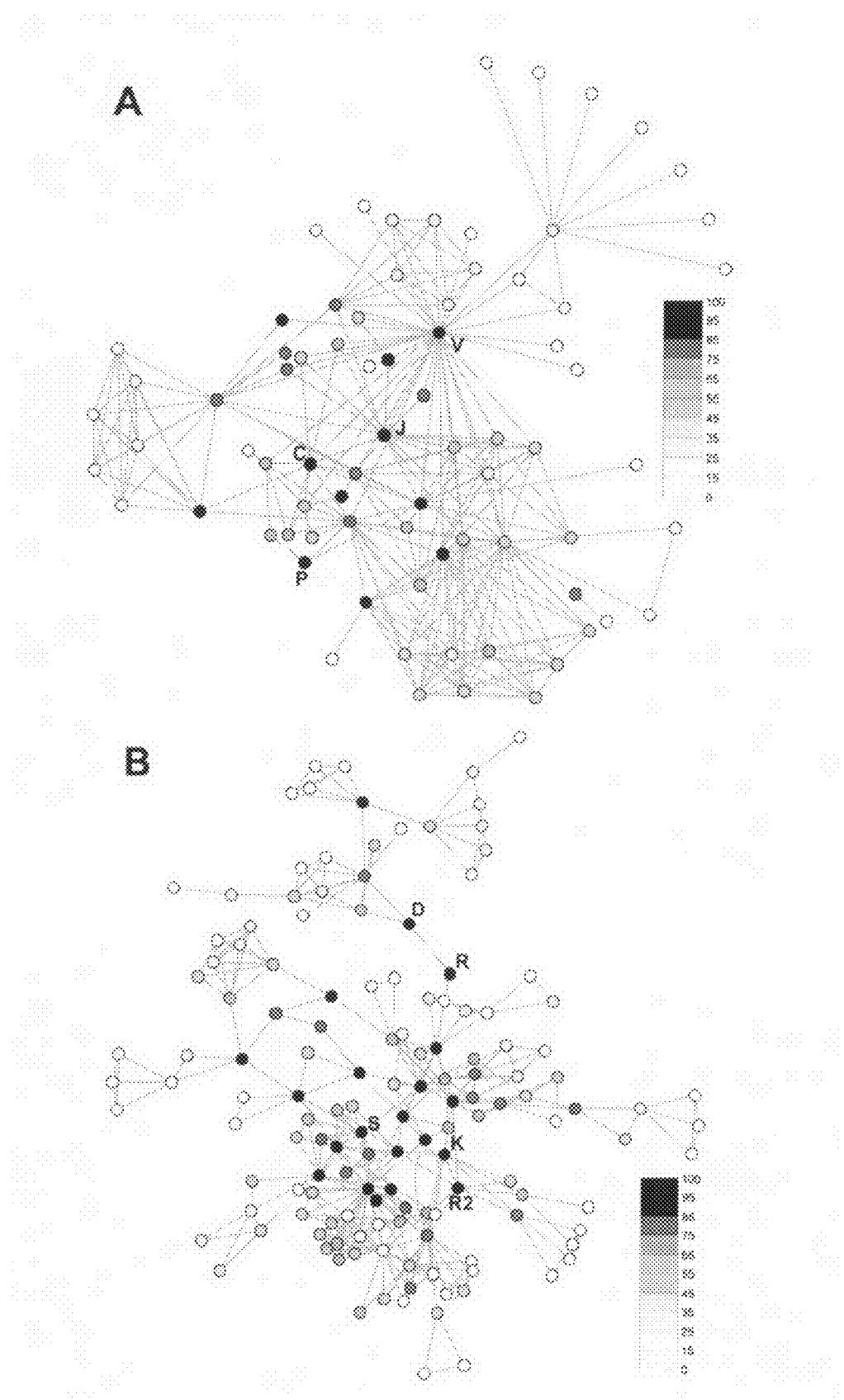
FIGS. 5A and 5B show the results for the use of a present invention method or apparatus with the Les Miserable Character Network and Physics Collaboration Network, respectively.

Les Miserable Character Network: FIG. 5A illustrates the social relationships Newman, M. E. & Girvan, M. Finding and evaluating community structure in networks (Phys Rev E Stat Nonlin Soft Matter Phys 69, 026113 (2004)) among the characters in the Victor Hugo novel, Les Miserable. This novel has numerous subplots and the resultant social network has complex inter-connectivity among sub-communities. The central character of the novel, Valjean had the highest bridging centrality and Javert, the police officer pursuing Valjean, had the second highest bridging scores. Valjean and Javert are identified as bridging nodes because they connect different modules or sub-plots in the novel. Interestingly, Pontmercy, a relatively minor character had $3^{rd}$ highest bridging score because this character connected the Javert, Marius and Cosette sub-communities identified by Newman and Girvan (Phys Rev E Stat Nonlin Soft Matter Phys 69, 026113 (2004)). Therefore, our bridging centrality metric identifies the nodes positioned between sub-communities in a complex social network.

Physics Collaboration Network: This social network was constructed Park, J. & Newman, M. E. Origin of degree correlations in the Internet and other networks (Phys Rev E Stat Nonlin Soft Matter Phys 68, 026112 (2003)) from the bibliography section of a review by Newman (Newman, M. E. J. The structure and function of complex networks. SIAM Review 45, 167-256 (2003)). The bridging nodes (FIG. 5B) are strategically positioned on the paths between modular sub-communities, (Phys Rev E Stat Nonlin Soft Matter Phys 69, 026113 (2004)). The nodes corresponding to the physicists, Rothman and Dodds, had the highest and $3^{rd}$ highest bridging centrality values because the nodes were on the path providing the only connection between the two large communities in the network. The nodes corresponding to the Boston University physicists, Redner and Krapivsky, which had the $2^{nd}$ and $4^{th}$ highest bridging centrality values, were located between the Notre Dame University and the Clarkson University groups.

Application on a Web Network

Figure 6:
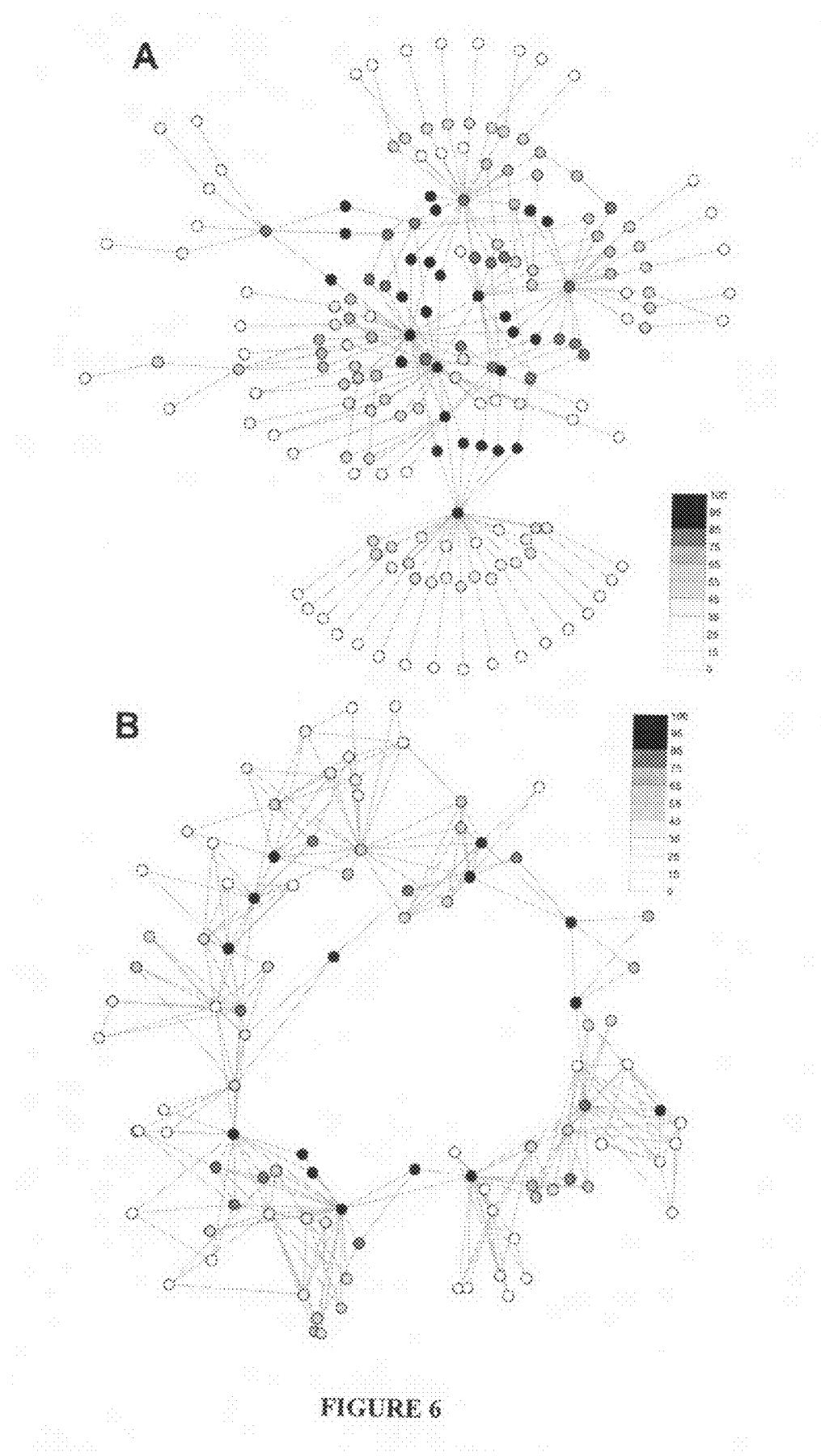
FIGS. 6A and 6B show the results for the use of a present invention method or apparatus with the AT&T Web Network and RPI Web Network, respectively.

AT&T Web Network: This network (North, S. in Symposium on Graph Drawing GD'96 409 (Springer, Berkely, Calif., 1996)) has low modularity, which makes it difficult to differentiate modular regions and their connecting nodes. By visual inspection of FIG. 6A, it is apparent that bridging centrality successfully identified the bridging nodes in the AT&T Web Network despite the low network modularity.

RPI Web Network: The RPI Web Network (North, S. in Symposium on Graph Drawing GD'96 409 (Springer, Berkely, Calif., 1996)) is more modular than the AT&T Web Network example and is more typical of real world Web networks. Visual inspection of FIG. 6B indicates that nodes identified by bridging centrality are located on the connections between modular regions.

Performance of Bridging Centrality on Biological Networks

High throughput assay methodologies such as microarrays and mass spectrometry have resulted in rapid growth of biological network data sets, the analysis of which can potentially yield insights into the mechanisms of human disease and the discovery of new therapeutic interventions (Hwang, W., Cho, Y. R., Zhang, A. & Ramanathan, M. A novel functional module detection algorithm for protein-protein interaction networks. Algorithms Mol Biol 1, 24 (2006)). Biological networks can be diverse in structure but in many cases, involve ordered sequences of interactions rather than interconnections. The majority of proteins in a given functional category do not have direct physical interaction with other proteins involved in the same function category (Hwang, W., Cho, Y. R., Zhang, A. & Ramanathan, M. A novel functional module detection algorithm for protein-protein interaction networks. Algorithms Mol Biol 1, 24 (2006)).

Cardiac Arrest Network: We evaluated the performance of bridging centrality on network model for the genes involved in human cardiac arrest (Arking, D. E., Chugh, S. S., Chakravarti, A. & Spooner, P. M. Genomics in sudden cardiac death. Circ Res 94, 712-23 (2004)). This network (FIG. 7A) is modular and has many peripheral nodes with contains 4 major hubs, Grb2, PP2A, PKA and PP1, that are connected by bridges. The nodes corresponding to SRC, SHC and JAK2, the three main bridges between the two largest modules, GRB2 and PP2A modules, had the highest, $2^{nd}$ and $3^{rd}$ highest bridging centrality values, respectively. An analysis of the pharmacology literature was used to assess their importance as drug targets in cardiac diseases. Isoproteronol, a β adrenergic receptor agonist, has been shown to attenuate phosphorylation of both Shc and Src proteins in cardiomyocytes (Zou, Y. et al. Isoproterenol activates extracellular signal-regulated protein kinases in cardiomyocytes through calcineurin. Circulation 104, 102-8 (2001)). The angiotensin receptor 2, the target of drugs such as losartan, also signals via Src and Shc in cardiac fibroblasts (Yamazaki, T., Komuro, I., Shiojima, I. & Yazaki, Y. The molecular mechanism of cardiac hypertrophy and failure. Ann N Y Acad Sci 874, 38-48 (1999)). Jak2 activation is a key mediator of aldosterone-induced in angiotensin-converting enzyme expression; the latter is the target of drugs such as captopril, enapril and other angiotensin-converting enzyme inhibitors (Sugiyama, T. et al. Aldosterone induces angiotensin converting enzyme gene expression via a JAK2-dependent pathway in rat endothelial cells. Endocrinology 146, 3900-6 (2005)).

Theoretical Analysis on Yeast Metabolic Network

Figure 7:
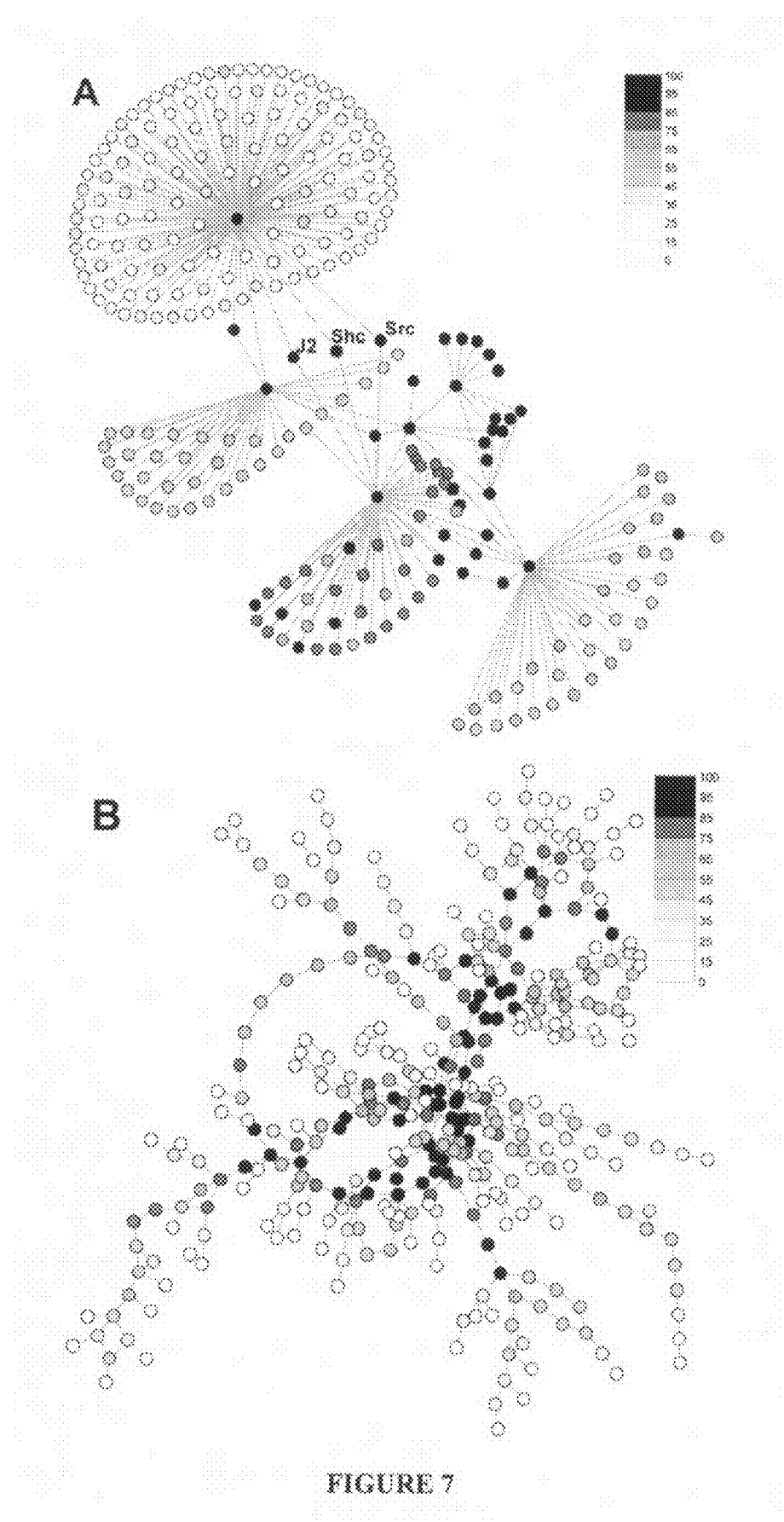
FIGS. 7A and 7B show the results for the use of a present invention method or apparatus with the Cardiac Arrest Network and Yeast Metabolic Network, respectively.

We extended the results to the much larger well-studied yeast metabolic network[17], which contains 359 nodes and 435 edges in FIG. 7B. Again, despite the additional complexity and increased size of the network, nodes involved in bridging larger modules to each other were selectively identified.

We examined several characteristics of bridging nodes using node deletion (FIGS. 8A-8F). Nodes with the highest values of bridging centrality (or other network metrics) were sequentially removed and the Neyman-Pearson divergence (NPD), a measure of the distance between two distributions, was used to assess the changes to network properties relative to the intact network.

Figure 8:
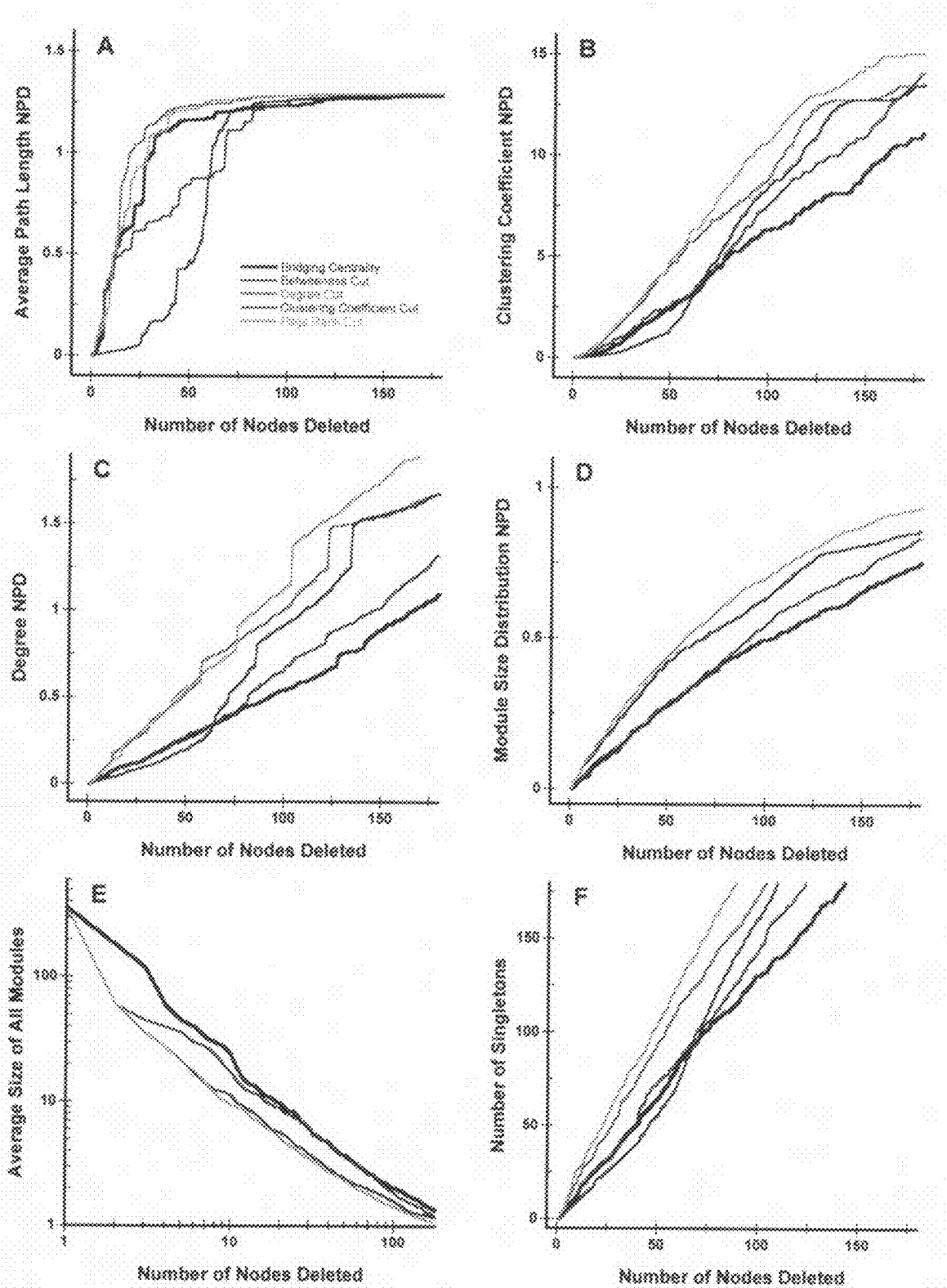
FIGS. 8A-8F assesses disruption and structural integrity associated with use of a present invention method or apparatus.

The removal of nodes with high bridging centrality values causes changes to the path length distribution that are comparable to the changes that occur with degree cut and pagerank cut (FIG. 8A). The changes to path lengths with degree cut and pagerank cut are not unexpected because these metrics by definition target nodes with numerous edges. Because of their broad specificity, these metrics also cause relatively large changes to the clustering coefficient (FIG. 8B) and degree distributions (FIG. 8C) and rapid generation of isolated singletons (FIG. 8F) indicating that the removal of nodes based on these metrics leads to loss of structural integrity. The removal of the high clustering coefficient nodes results in the removal of nodes that are not critical in part because the high inter-connectivity among neighbors provides alternative paths to signal flow. Although the clustering coefficient cut retained network structural integrity, it was also associated with the least changes to the path length distribution. The betweeness cut showed comparable behaviors with bridging centrality in the clustering coefficient, degree, module size distribution NPD, and singleton production. However, its ability to cause network disruption as assessed by the path length NPD was abruptly weakened after the $3^{rd}$ percentile and the average module sizes were smaller. In contrast, removal of nodes based on bridging centrality causes comparatively small changes to the clustering coefficient (FIG. 8B) and degree distributions (FIG. 8C). Furthermore, the loss of network modularity (FIG. 8D-E) and generation of singletons (FIG. 8F) is also comparatively low when nodes with high bridging centrality are targeted. Consequently, targeted deletions of nodes with high bridging centrality cause large disruptions to the network without causing the high extensive loss of structural integrity that is associated with the other metrics. Bridging centrality preserves the network structural integrity and the modularity better than the other metrics.

The experiments demonstrate that bridging nodes occupy critical locations in the network and that bridging centrality uniquely complements the other network metrics.

Discussion and Conclusion

Jeong's group has espoused the degree of a node as a key basis for essential components identification. These high degree nodes are called hubs, and hubs have been found to be important determinants of survival in network perturbation. Power-law networks are very robust to random attacks but very vulnerable to targeted attack in this model. Hahn's group looked for differences in degree, betweenness, and closeness centrality between essential and nonessential genes in three eukaryotic protein interaction networks: yeast, worm, and fly. These three interaction networks are found to have remarkable similar structure and the proteins that have a more central position in networks, regardless of the number of direct interactors, evolve more slowly and are more likely to be essential for survival. Estrada's group introduces a new centrality measure, which is called subgraph centrality that characterizes the participation of each node in all subgraphs in a network. The subgraph centrality is better able to discriminate the lethal nodes of a network than any other measures in protein interaction networks. Palumbo's group tried to find lethal nodes by arc deletion, which could lead to sub components isolation. They showed that lethality corresponds to the lack of alternative paths in the perturbed network linking the nodes affected by the enzyme deletion on yeast metabolic network which is a directed network. Existing approaches are focusing only on finding central and lethal nodes, and it has been proven that these existing approaches can discriminate lethal nodes very well. We argue that identifying network's essential components with these existing methods is likely to prove suboptimal because of their limited view of looking at the problem. Guimera's group devised a clustering method to identify functional modules in metabolic pathways and categorized the role of each component in the pathway according to their topological location relative to detected functional modules. Annotating locality of components in network's topology based on a certain clustering method is totally biased by the used clustering method. So identifying components' topological location, e.g., hubs, peripheral nodes, or bridging nodes, independent from any other methods is more preferable.

While other existing approaches are focusing on targeting high degree, high central, and high lethal components in network topology, our bridging centrality discriminates the bridging nodes with more information flowed through them, i.e., more central from the information flow aspect, and also positioned between highly connected regions. We have shown that bridging centrality successfully distinguishes the bridging nodes in several real world scale-free networks including social, biological, and technical networks. Theoretical analysis of the yeast metabolic network, observing the clustering coefficient changes and the average path length behaviors, were performed and showed that the nodes picked up by bridging centrality are well positioned on the connecting spots between modules.

Throughout the performed experiments, bridging centrality did a great job on identifying the bridging nodes in real world networks. Bridging centrality has many possible applications on many research areas. The recognition of the bridging nodes and information about the bridging nodes should be very valuable knowledge for further fruitful achievements in biological researches and in other fields too. For example, identifying functional or physical modules or identifying the key components in biological networks using the bridging centrality will provide a very effective and totally new way of looking biological network structures. This promising outcome should also be applicable to social networks for detecting sub community structures or discovering the key elements in them. As we observed in the previous section, while the perturbations on hubs or the nodes selected by other centrality indices caused a few local singleton isolations and might have many alternative paths due to their high clustering property, which is one of the main properties of the scale-free networks, among neighbors inside the module, the failures on the bridging nodes, unsurprisingly, caused whole module isolations from the rest of the network and might have longer alternative paths or no alternative path at all. So the interruptions on the bridging nodes could be much more lethal, and the cost of network failure by interrupting the bridging nodes would be much higher than the failure on the other nodes. Therefore, we claim that the bridging nodes picked up by bridging centrality also reside on the critical positions and also are worth getting attentions for the network robustness improvement and paths protection standpoint.

It was clearly shown that the bridging nodes discriminated by bridging centrality are well positioned between highly connected modules in scale-free networks. Using this bridging centrality superiority, clustering analysis on scale-free networks can be accomplished through differentiating modules by considering the bridging nodes as the boundary of clusters.

Application of Invention

The following illustrates a practical application of the invention:

Functional Module Detection via Topological Analysis of Protein Interaction Networks Recent computational analyses of protein interaction networks have attempted to discover valuable information of cellular functions. One important feature of the protein interaction networks is hierarchical modularity. Clustering is one of the most efficient techniques for comprehensive analysis of such modular networks. In this work, a new modular network model was applied for the protein interaction network and provided a systematic analysis in a topological view. An accurate and efficient approach for modularization is presented. The algorithm focuses on detecting the interconnections among modules, which are defined as bridges. As results, the method identifies the modules that correspond to functional associations. Furthermore, it outperforms other previous clustering algorithms.

Introduction

The complete and systematic analysis of protein-protein interactions is one of the most fundamental challenges to understand cellular organizations, processes and functions. The interactions between two proteins provide clues to identify functional modules. Recent large-scale experiments of protein-protein interactions, such as two-hybrid systems and mass spectrometry, have enriched interaction data, and led to build the integrated protein interaction networks. The current huge volume of protein interaction data has raised difficulty to be experimentally analyzed. Consequently, computational analysis of the networks has been necessarily concerned to determine functionally associated proteins. However, previous analyses of protein interaction networks have suffered from the complexity of the networks and large amounts of noisy data.

Various clustering approaches have been applied to protein interaction networks to discover valuable information of cellular functions. Clustering is the process of grouping data objects into clusters which demonstrate greater similarity among objects in the same cluster than in different clusters. The functions of uncharacterized proteins can be predicted by the clustering results of the protein interaction networks. Since the protein interaction network can be represented as an undirected, unweighted graph with proteins as nodes and interactions as edges, most of the previous clustering approaches have utilized graph topology such as the connectivity of nodes. Several methods focus on detecting densely connected sub-graphs as clusters. In this definition, clusters can be determined by maximizing a density function. A major drawback of this work is that it ignores large numbers of nodes that are sparsely connected. Another approach introduced is an algorithm that partitions a network into clusters based on minimum cutting cost. It may be problematic because of a bunch of clusters whose sizes are very small. Betweenness was applicable to detect the best position for partitioning a network. Betweenness is a measure to find centrally located nodes in a graph. However, it is biased to the nodes with high connectivity. Therefore, clustering by removing the nodes or edges with high betweenness values may overlook informative objects of a protein interaction network.

This study explores the topological structure of protein interaction networks. Previous works have observed that most biological networks are scale-free, which means the degree distribution of the networks is approximated by a power law $P(k) \sim k^{-\gamma}$, where k is the degree of each node and $2 \leq \gamma \leq 3$. An important feature of the scale-free networks is that many low-degree nodes are frequently connected to a very few high-degree nodes with short-length paths by small world property. A recent study introduced hierarchical modularity in scale-free networks. In a modular network model, a module is formed by densely connected core nodes, and two modules are linked by sparse interconnections between two nodes in different modules. This work proposes a new strategy to systematically analyze modular networks. First, categorize the components in a network based on their topological roles. Next, quantify how likely each node or edge works for interconnecting modules. Finally, an algorithm is presented to discover functional modules from the protein interaction networks. The method identifies modules by precisely detecting the interconnections among the modules.

Method

Topological Modeling for Modular Networks

The protein interaction network is represented as an undirected, unweighted graph G(V,E) with proteins as a set of nodes V and interactions as a set of edges E. A set of neighbors of $v_i$, $N(v_i)$, is denoted as a set of nodes directly connected to $v_i$. $|N(v_i)|$ is the number of nodes in $N(v_i)$, which equals the degree of $v_i$, $deg(v_i)$.

A module (or a cluster) G' in G is a sub-graph of G whose nodes have homogeneous features. In real biological or social networks, modules (or clusters) are interconnected each other. A part of nodes in each module participates in the interconnections. The clustering problem of such a modular network is to determine a complete set of modules (or clusters) in the graph.

Figure 9:
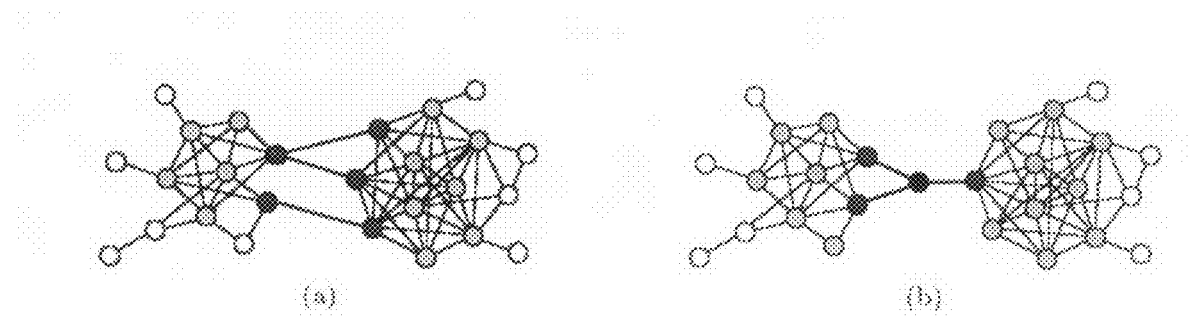
FIG. 9 illustrates examples of modular networks that are composed of two modules.

In a topological view of a network, nodes in a module can be categorized into three groups, modular nodes, peripheral nodes and interconnecting nodes. First, modular nodes are the core nodes to form a module. They have relatively high degree of connectivity to the members in the same modules. Next, peripheral nodes are the trivial nodes with low degree. They are linked to modular nodes or the other peripheral nodes in the same module. Last, interconnecting nodes are connected to the nodes in the other modules. We define the edge that connects two nodes in different modules as a bridge. Therefore, two end nodes of a bridge should be interconnecting nodes. In FIG. 9(a), five dark gray nodes represent interconnecting nodes. Light gray and white nodes are modular nodes and peripheral nodes, respectively. Three thick edges are bridges connecting two modules. FIG. 9(a) illustrates the three types of nodes in a simple network that is composed of two modules.

Whereas two modules are directly connected by a bridge in many cases, one node sometimes exists in the middle of the bridge for the purpose of supporting the interconnection. It is denoted as a bridging node. The bridging node is linked to two or more interconnecting nodes in different modules. If we consider a network as an information flow, such bridging nodes are the most critical for maintaining the whole network. In FIG. 9(b), a black node represents bridging nodes. Three dark gray nodes are interconnecting nodes, and three thick edges are bridges connecting from the bridging node to each module. FIG. 9(b) displays two modules connected from a bridging node.

In our modular network model, the bridges and bridging nodes can be hierarchically distributed. As a network consists of several modules connected by bridges, each module can possess several sub-modules connected by sub-bridges. This hierarchical structure is an essential concept for the systematic analysis of a network.

Modularity and Similarity

Modularity is an important measure to assess the denseness of a graph or a sub-graph. For a given graph or sub-graph G(V,E), modularity M(G(V,E)) can be computed by counting actual intra-connections in a module over all possible edges among the nodes in the module:

$$M(G(V, E)) = \frac{|E|}{|V|(|V|-1)/2} \quad (1)$$

Notice that $E_{N(v)}$ is the set of edges that connect between two nodes in $N(v)$. Then $M(G'(N(v), E_{N(v)}))$ is equivalent to the clustering coefficient of a node v.

Node similarity is another useful index to determine modules from a graph. By the concept of set similarity, two nodes are considered similar if they share many of neighbors. High similarity between two nodes then indicates that the two nodes are plausible to be in the same module. Among a variety of set similarity indices, we used Simpson's coefficient for this work. Suppose $X_v$ is a set of neighbors of v including v itself. The similarity $S_{st}$ of two nodes s and t can be computed by $$S_{st} = \frac{|X_s \cap X_t|}{\min(|X_s|, |X_t|)} \quad (2)$$

Consider a low degree node s and a high degree node t in the same functional module. Suppose they are linked each other, and $N(s)$ is a small subset of $N(t)$. As frequently appeared in biological networks, the node s may be selectively linked to its partner due to biochemical issues. In this case, we can explicitly judge that s and t are included in the same module by formula (2).

Hierarchical Modularization

The goal of this work is to accurately and efficiently identify functional modules in complex protein interaction networks. Our modularizing algorithm is designed to hierarchically generate modules by removing bridging nodes and bridges. The algorithm is based on two processes as follows:

Process 1. (Removal of bridging nodes) This is the process to compute the bridging score $B_r(v)$ for each node v and successively remove v with the highest value of $B_r(v)$ until the graph is split into sub-graphs or the clustering coefficient of the graph reaches a given threshold.

Process 2. (Removal of bridges) This is the process to compute the bridging score $B_r(e)$ for each edge e and successively remove e with the highest value of $B_r(e)$ until the graph is split into sub-graphs.

The process 1 can be switched to process 2 according to the clustering coefficient $C(G)$ of a graph G. The clustering coefficient $C_v$ of a node v is calculated by the actual edges in $N(v)$ divided by all possible edges in $N(v)$. The clustering coefficient $C(G)$ of a graph G is then defined as the average clustering coefficient of all nodes in G. When a bridging node is removed from a modular network G, the clustering coefficient $C(G')$ of the new graph G' is increased because G' is more modular than G. If we successively remove the nodes in G starting from the top bridging node, then the graphs will show a pattern of increase of clustering coefficients until all potential bridging nodes are removed. Therefore, the end of the increasing pattern can be a noticeable switching point from process 1 to process 2. Consider ΔC as the difference of clustering coefficients between a graph G and a reduced graph G'. Process 1 then requires the condition such that ΔC=C(G')−C(G)>0 and can be switched to process 2 when ΔC=C(G')−C(G)≦0. The details of the typical patterns of clustering coefficients in a modular network will be discussed in the next section.

The whole algorithm of the hierarchical modularization, BridgeCut, is described in Algorithm 1. The input is a graph of protein interaction network, G(V; E), and each module generated by the algorithm is added into the list $L_s$, which is a global variable. The algorithm traces the recursion tree, as it calls the entire procedure recursively with each module as an input, from the top level to the bottom level. The modules that created from lower level have smaller number of nodes and generally higher modularity than those from higher level. The algorithm terminates each recursive procedure when the size of the module reaches the threshold $\theta_s$ as a minimal size, or the modularity is greater than or equals to a given threshold $\theta_m$.

---
Algorithm 1: BridgeCut (G(V,E)).

1: if |V|<$\theta_s$ or M(G)≧$\theta_m$ then
2:    insert G into $L_s$
3: else
4:    compute $B_r(v)$ for each node v in G
5:    while G is not split do
6:      if Δ C < 0 then
7:        compute $B_r(e)$ for each edge e in G
8:        break while
9:      end if
10:     remove a node v with highest $B_r(v)$ from G
11:   end while
12:   while G is not split do
13:     remove an edge e with highest $B_r(e)$ from G
14:   end while
15:   for each sub-graph G'(V',E') do
16:     BridgeCut(G'(V',E'))
17:   end for
18: end if

---

Experiments and Results

Topological Analysis

We obtained core protein interaction data of *Saccharomyces cerevisiae* from January 2006 version of DIP, the database of interacting proteins, which contains 2526 distinct proteins and 5949 interactions. The core interactions were selected from full data by verifying the reliability of each interaction using other biological information, such as protein sequences and RNA expression profiles. The degree distribution of the core data set demonstrates that the network is scale-free with γ≈2. Furthermore, by the inverse dependence of the clustering coefficient of each node on degree, we can judge that the core data set forms the hierarchical modular network structure.

Figure 10:
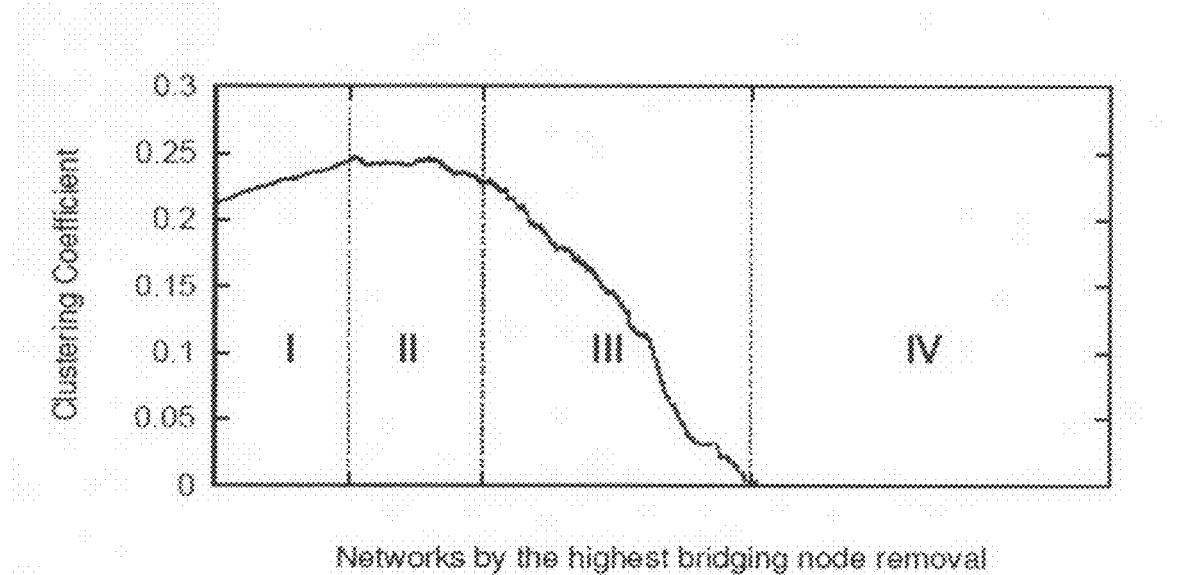
FIG. 10 illustrates changes of clustering coefficients of networks that are successively reduced by one node with the highest bridging score.

In our modular network model, bridging nodes interconnect two or more modules, each of which has higher modularity than the entire network. Therefore, removing the bridging nodes can increase the modularity of the network. We computed the clustering coefficient of each network while we successively delete the bridging node with the highest $B_r(v)$. In FIG. 10, the range (I) refers to the top 15% of removal steps, (II) refers to the next 15%, (III) refers to the next 30%, and (IV) refers to the rest. Bridging nodes, interconnecting nodes, modular nodes, and peripheral nodes are mostly removed, respectively, in (I), (II), (III), and (IV). FIG. 10 exhibits the alterations of clustering coefficients of the networks, each of which is reduced from a previous network by one node. We can observe four distinctive patterns in the result. In the first 15% of the sequence of networks, the clustering coefficients were gradually increased. In the next 15%, they were fluctuated within a small range. In the next 30%, they were dramatically decreased. In the others, they were 0. These patterns reveal the four classes of nodes in a modular network, which represent bridging nodes, interconnecting nodes, modular nodes, and peripheral nodes. The bridging nodes were mostly removed in the first 15% of the deleting steps, the interconnecting nodes in the next 15%, and the modular nodes in the next 30%. Hence, the result of this experiment can approximate the amount of bridging nodes in a network. In the core protein interaction network, around 30% of nodes perform the role of interconnecting modules at the top level of hierarchy. Half of them work for only bridging.

Biological Analysis

Lethality is a crucial factor to characterize the biological essentiality of a protein. It is determined by examining whether a module is functionally disrupted when the protein is knocked out. We obtained the protein lethality information from MIPS database, which reports whether a protein is lethal or viable.

Figure 11:
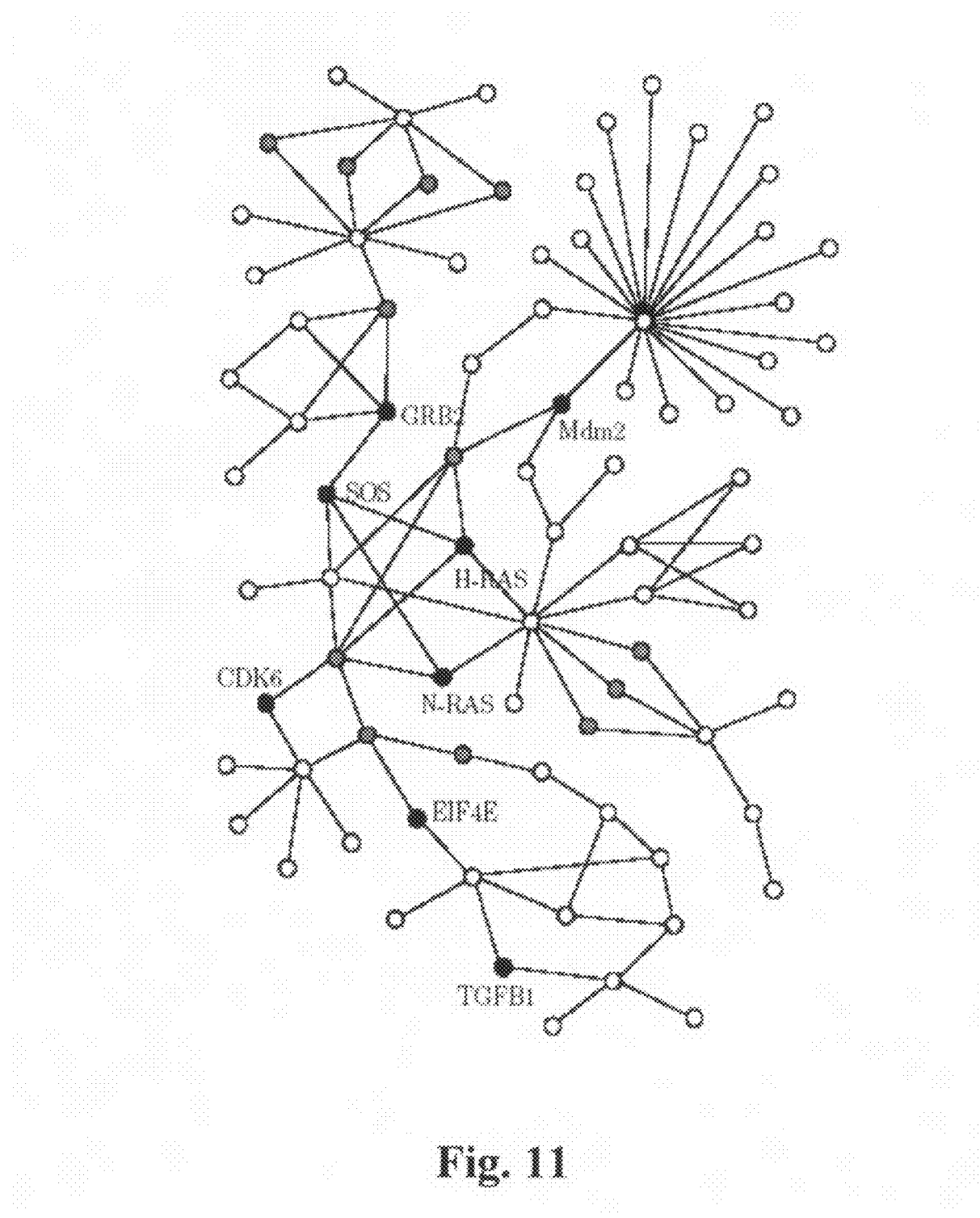
FIG. 11 is a schematic of undirected graph network model for the p53 protein with 82 nodes and 106 edges; and, FIG. 12 is a schematic block diagram of a present invention apparatus.

To investigate the biological importance of nodes, we scaled the proportion of lethality with bridging scores in FIG. 11. After sorting all nodes by bridging scores in descending order, we grouped them into 7 bins and calculated the proportion of lethal proteins in each bin. The first bin has lower lethality than the entire core data, and the lethality is increased up to the fifth bin. The last two bins include only a few lethal nodes. This behavior can be divided into the four groups regarding to the topological classes of nodes as described in the previous section. Bridging nodes are dominated in the first bin, which has relatively low lethality. Interconnecting nodes mainly occupy the next bin, which has higher lethality than the first bin. Modular nodes and peripheral nodes have the highest and lowest proportion of lethal proteins, respectively. This result implies that many of the bridging nodes do not perform critical tasks for biological functions. This experiment proves that the biological importance of nodes can be properly analyzed by the topological structure of networks.

Modularization Results

We implemented our hierarchical modularization algorithm with core protein inter-action data from DIP. As the thresholds for the size $\theta_s$ and modularity $\theta_m$ in Algorithm 1, 15 and 30% are empirically chosen, respectively. For $\Delta C$, we compared the clustering coefficient of current network G with the predecessor G''' that occurred 3 steps before, that is, $\Delta C=C(G''')-C(G)$. Among all modules generated by our algorithm, we selected 123 modules with the size greater than or equal to 5.

To validate that our algorithm successfully recognizes functional modules, we used the comprehensive functional catalogue provided by MIPS. The catalogue hierarchically arranges the functions and consists of 17 different functional categories on the top level. We assigned one major function out of 17 to each module generated by our algorithm. We evaluated the modules by monitoring the p-values based on the hypergeometric distribution, as several previous works used, such that $$P = 1 - \sum_{i=0}^{k-1} \frac{\binom{|X|}{i}\binom{|V|-|X|}{n-i}}{\binom{|V|}{n}} \quad (9)$$

where |V| is the total number of nodes, |X| is the number of nodes in the major functional category, n is the number of nodes in a module, and k is the number of common nodes between the functional category and the module. The formula (9) can be understood as the probability that at least k nodes in a module with size n are included in a particular category with size |X|. Low p-value signifies that the module is highly accurate because the network has a rare chance to produce the module. The top 20 modules in p-value generated by our algorithm are listed in Table 2.

TABLE 2

Top 20 modules in p-value generated by our modularization algorithm, BridgeCut.

| Cluster Size | Assigned Major Function | -log (p-value) | Uncharacterized Protein |
|---|---|---|---|
| 133 | Cellular Transport | 41.93 | YBL049w, YDR084c, YLR124w, YBR187w, YCR076c, YNL181w |
| 99 | Transcription | 23.17 | YPL105c, YKL023w, YHR035w, YNL050c, YBR094w, YKL183w, |
| 35 | Cell Type Differentiation | 14.88 | YER158c |
| 15 | Interaction with Cell Environment | 14.07 | |
| 18 | Energy | 13.76 | |
| 39 | Transcription | 13.58 | YFR011c |
| 28 | Cell Cycle and DNA Processing | 13.57 | YHL023c, YLR123c |
| 19 | Cell Fate | 13.23 | YML053c |
| 9 | Protein Synthesis | 8.77 | |
| 21 | Transcription | 8.73 | YGR210c |
| 17 | Biogenesis of Cellular Components | 7.87 | |
| 20 | Transcription | 7.72 | YLR358c, YLR322w |
| 44 | Protein Fate | 7.55 | YJL064w |
| 9 | Cellular Communication | 7.50 | YFR044c |
| 14 | Transcription | 7.26 | |
| 7 | Protein Synthesis | 7.25 | YLR287c |
| 11 | Cellular Transport | 6.55 | |
| 10 | Protein Synthesis | 6.46 | |
| 16 | Protein with Binding Function | 6.28 | |
| 15 | Cell Cycle and DNA Processing | 6.21 | |

Two previous methods were also implemented: highest betweenness node cut and highest betweenness edge cut. In the same way, the modules, whose sizes are greater than or equal to 5, were collected. Table 3 compares the overall performance of our algorithm, BridgeCut, with the two methods. First, the modules by BridgeCut are larger on average than those by the other methods. Since betweenness node cut produced too many tiny clusters, it ignored a large amount of nodes, which may be important members in modules. Next, based on the p-values, the modules by Bridge-Cut are more accurate than those by the others. In particular, BridgeCut surpassed betweenness edge cut in the number of highly accurate modules. These results indicate that our algorithm determined some modules that are closer to the real functional modules than the other methods. Finally, to investigate the significance of modules, it was examined whether each module is governed by hub nodes with high connectivity. When a node with the highest degree in each module was considered, the average value of all modules by BridgeCut was the highest of all three methods. This result implies that BridgeCut evenly partitioned the network in terms of the connectivity, and most of modules by BridgeCut are meaningful in a topological structure of the network. Consequently, BridgeCut clearly outperformed the other two methods in all categories in Table 3.

TABLE 3

Comparison of modularization results.

| Category | BridgeCut | Betweenness Node Cut | Betweenness Edge Cut |
|---|---|---|---|
| Number and Size of Modules | | | |
| total number of modules | 123 | 100 | 120 |
| average size of modules | 13.08 | 10.59 | 12.96 |
| largest size of modules | 133 | 46 | 79 |
| Accuracy of Modules | | | |
| average in pScore | 4.01 | 3.30 | 3.89 |
| average of top 20 in pScore | 11.45 | 7.89 | 10.55 |
| number of modules with pScore > 6 | 21 | 12 | 21 |
| number of modules with pScore > 12 | 8 | 4 | 5 |
| Significance of Modules | | | |
| average in maximum degrees | 18.57 | 7.69 | 14.64 | pScore represents −log (p-value).

CONCLUSION

A new modular network model, has been developed which is applicable to protein interaction networks. An accurate and efficient approach for modularization has been presented based on the systematic analysis of the network in a topological view.

The major strength of the method is the accuracy of the modularization results. It has been proved in Table 3. The functional catalogue in MIPS shows that there are still large number of functionally uncharacterized proteins in the yeast database even though the yeast is one of the most well-studied organisms. The ultimate aim of bioinformatics research is to precisely predict biological functions of such unknown proteins. Our approach provided a novel strategy to predict the functions. Each module generated by our algorithm contains a few uncharacterized proteins, which are listed in Table 2. It is suggested that those proteins positively work for the corresponding functions that are assigned to the modules.

The algorithm efficiently runs with a huge protein interaction network. The time complexity of the algorithm depends on the computation of betweenness. It is currently able to be computed in O(nm) time where n is the number of nodes and m is the number of edges. Furthermore, the successive deletion of interconnections among modules can quickly simplify the complex network.

One of the main difficulties of current interaction network analysis is the enormous amount of noisy data. The numerous false positives result in an extremely biased topological structure of the network. Besides our topological analysis, the reliability assessment of protein-protein interactions using any other biological knowledge can strongly enhance the performance of the network analysis.

Figure 12:
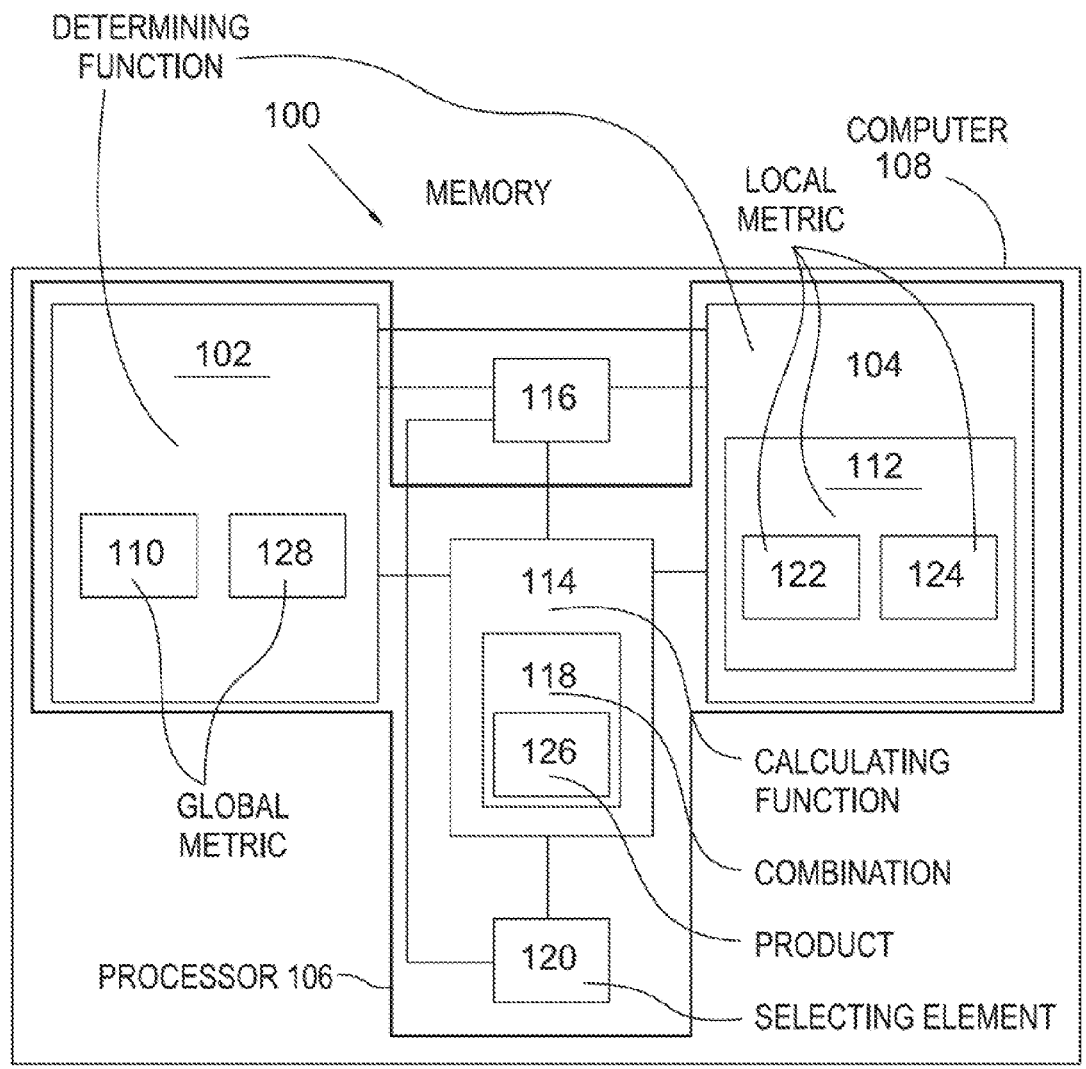

FIG. 12 is a schematic block diagram of present invention apparatus 100 for identifying a bridge node in a network. Apparatus 100 includes: determining elements, or functions, 102 and 104 in processor 106 for specially programmed general-purpose computer 108. Element 102 is arranged, for each first node (not shown) in a plurality of nodes (not shown) in a network (not shown), to determine global metric 110 proportional to total signal flow in the network and signal flow through each first node. Element 104 is arranged, for each first node, to determine local metric 112 proportional to signal flow between each first node and each second node (not shown) in the network connected to each first node. Apparatus 100 also includes calculating element, or function, 114 in the processor. Element 114 is arranged to calculate, for each first node, using memory element 116 in the general-purpose computer, combination 118 of global metric 110 and said local metric 112. Apparatus 100 includes selecting element 120 in the processor arranged to select, using the memory element, a bridge node (not shown) from among the plurality of nodes based on said combinations 118.

In some aspects, element 104 is arranged to determine, for each first node, local metric 122 proportional to signal flow (not shown) between each first node and each second node and signal flow between each second node and each third node in said network connected to at least one of the second nodes. In some aspects, element 104 is arranged to determine, for each first node, local metric 124 proportional to the largest and second largest signal flows from among the respective signal flows between each first node and each second node. In some aspects: global metric 110 includes the signal flow through each first node divided by the total signal flow in the network; a denominator for local metric 122 is the signal flow between each first node and each second node; local metric 124 is the second largest signal flow divided by said largest signal flow; the calculating element is arranged to calculate product 126 of the global metric and local metrics 122 and 124 for each first node; and the selecting element is arranged to select the first node with the largest product as a bridge node. In some aspects, element 102 is arranged to determine, for each first node, global metric 128 proportional to a total number of paths connecting node pairs in the network and a total number of these paths connected to each first node (not shown).

Computer 108 can be any computer or combination of computers known in the art. Memory element 116 and processor 106 can be any memory element or processor, or combination thereof, known in the art.

Thus, it is seen that the objects of the invention are efficiently obtained, although changes and modifications to the invention should be readily apparent to those having ordinary skill in the art, without departing from the spirit or scope of the invention as claimed. Although the invention is described by reference to a specific preferred embodiment, it is clear that variations can be made without departing from the scope or spirit of the invention as claimed.

What is claimed is:

1. A method for identifying a bridge node in a network, comprising the steps of:
   determining, for each first node in a plurality of nodes in said network, using a processor in a specially programmed special purpose-purpose computer, a global metric proportional to total signal flow in said network and signal flow through said each first node;
   determining, for said each first node using said processor, a first local metric proportional to signal flow between said each first node and each second node in said network connected to said first node and signal flow between said each second node and each third node in said network connected to at least one of said each second node;
   determining, for said each first node using said processor, a second local metric proportional to a largest and second largest signal flows from among the respective signal flows between said each first node and said each second node;

calculating, for said each first node using said processor and a memory element in said general-purpose computer, a combination of said global metric and said first and second local metrics; and, selecting, using said processor and said memory element, a bridge node from among said plurality of nodes based on said combinations.

2. The method of claim 1 wherein said global metric comprises said signal flow through said each first node divided by said total signal flow, wherein a denominator for said first local metric comprises said signal flow between said each first node and each second node, wherein said second local metric comprises said second largest signal flow divided by said largest signal flow, wherein calculating a respective combination comprises calculating a respective product of said global metric and said first and second local metrics for said each first node, and wherein selecting a bridge node comprises selecting said each first node with a highest said respective product.

3. A method for identifying a bridge node in a network, comprising the steps of:

determining, for each first node in a plurality of nodes in said network, using a processor in a specially programmed special purpose-purpose computer, a global metric proportional to total signal flow in said network and signal flow through said each first node;

determining, for said each first node using said processor, a local metric proportional to signal flow between said each first node and each second node in said network connected to said each first node;

calculating, for said each first node using said processor and a memory element in said general-purpose computer, a combination of said global metric and said local metric; and, selecting, using said processor and said memory element, a bridge node from among said plurality of nodes based on said combinations.

4. The method of claim 3 wherein determining a local metric comprises:

determining, for said each first node using said processor, a first local sub-metric proportional to said signal flow between said each first node and said each second node and signal flow between said each second node and each third node in said network connected to at least one of said each second node; and, determining, for said each first node using said processor, a second local sub-metric proportional to the largest and second largest signal flows from among the respective signal flows between said each first node and said each second node.

5. The method of claim 4 wherein said global metric comprises said signal flow through said each first node divided by said total signal flow, wherein a denominator for said first local sub-metric comprises said signal flow between said each first node and each second node, wherein said second local metric is equal to said second largest signal flow divided by said largest signal flow, wherein calculating a respective combination comprises calculating a respective product of said global metric and said first and second local sub-metrics for said each first node, and wherein selecting a bridge node comprises selecting said each first node with a highest said respective product.

6. A method for identifying a bridge node in a network, comprising the steps of:

determining, for each first node in a plurality of nodes in said network, using a processor in a specially programmed special purpose-purpose computer, a global metric proportional to a total number of paths connecting node pairs in said network and a total number of said paths connected to said each first node;

determining, for said each first node using said processor, a local metric proportional to signal flow between said each first node and each second node in said network connected to said each first node;

calculating, for said each first node using said processor and a memory element in said general-purpose computer, a combination of said global metric and said local metric; and, selecting, using said processor and said memory element, a bridge node from among said plurality of nodes based on said combinations.

7. The method of claim 6 wherein determining a local metric comprises:

determining, for said each first node using said processor, a first local sub-metric proportional to said signal flow between said each first node and said each second node and signal flow between said each second node and each third node in said network connected to at least one of said each second node; and, determining, for said each first node using said processor, a second local sub-metric proportional to the largest and second largest signal flows from among the respective signal flows between said each first node and said each second node.

8. The method of claim 7 wherein said global metric comprises said total number of said paths connected to said each first node divided by said total number of paths connecting node pairs in said network, wherein a denominator for said first local sub-metric comprises said signal flow between said each first node and each second node, wherein said second local metric is equal to said second largest signal flow divided by said largest signal flow, wherein calculating a respective combination comprises calculating a respective product of said global metric and said first and second local sub-metrics for said each first node, and wherein selecting a bridge node comprises selecting said each first node with a highest said respective product.

9. An apparatus for identifying a bridge node in a network, comprising:

a first determining element in a processor in a specially programmed special purpose-purpose computer arranged, for each first node in a plurality of nodes in said network, to determine a global metric proportional to total signal flow in said network and signal flow through said each first node;

a second determining element in said processor arranged to determine, for said each first node, a first local metric proportional to signal flow between said each first node and each second node in said network connected to said first node and signal flow between said each second node and each third node in said network connected to at least one of said each second node;

a third determining element in said processor arranged to determine, for said each first node, a second local metric proportional to a largest and second largest signal flows from among the respective signal flows between said each first node and said each second node;

a calculating element in said processor arranged to calculate, for said each first node, using a memory element in said general-purpose computer, a combination of said global metric and said first and second local metrics; and, a selecting element in said processor arranged to select, using said memory element, a bridge node from among said plurality of nodes based on said combinations.

10. The apparatus of claim 9 wherein said global metric comprises said signal flow through said each first node divided by said total signal flow, wherein a denominator for said first local metric comprises said signal flow between said each first node and each second node, wherein said second local metric comprises said second largest signal flow divided by said largest signal flow, wherein said calculating element is arranged to calculate a respective product of said global metric and said first and second local metrics for said each first node, and wherein said selecting element is arranged to select said each first node with a highest said respective product.

11. An apparatus for identifying a bridge node in a network, comprising:
  a first determining element in a processor in a specially programmed general-computer arranged, for each first node in a plurality of nodes in said network, to determine a global metric proportional to total signal flow in said network and signal flow through said each first node;
  a second determining element in said processor arranged to determine, for said each first node, a local metric proportional to signal flow between said each first node and each second node in said network connected to said each first node;
  a calculating element in said processor arranged to calculate, for said each first node, using a memory element in said general-purpose computer, a combination of said global metric and said local metric for said each first node; and,
  a selecting element in said processor arranged to select, using said memory element, a bridge node from among said plurality of nodes based on said combinations.

12. The apparatus of claim 11 wherein said second determining element is arranged to:
  determine, for said each first node using said processor, a first local sub-metric proportional to said signal flow between said each first node and said each second node and signal flow between said each second node and each third node in said network connected to at least one of said each second node; and,
  determine, for said each first node using said processor, a second local sub-metric proportional to the largest and second largest signal flows from among the respective signal flows between said each first node and said each second node.

13. The apparatus of claim 12 wherein said global metric comprises said signal flow through said each first node divided by said total signal flow, wherein a denominator for said first local sub-metric comprises said signal flow between said each first node and each second node, wherein second local metric comprises said second largest signal flow divided by said largest signal flow, wherein said calculating element is arranged to calculate a respective product of said global metric and said first and second local sub-metrics for said each first node, and wherein said selecting element is arranged to select said each first node with a highest said respective product.

14. An apparatus for identifying a bridge node in a network, comprising:
  a first determining element in a processor for a specially programmed special purpose-purpose computer arranged, for each first node in a plurality of nodes in said network, to determine a global metric proportional to a total number of paths connecting node pairs in said network and a total number of said paths connected to said each first node;
  a second determining element in said processor arranged to determine, for said each first node, a local metric proportional to signal flow between said each first node and each second node in said network connected to said each first node;
  a calculating element in said processor arranged to calculate, for said each first node using a memory element in said general-purpose computer, a combination of said global metric and said local metric for said each first node; and,
  a selecting element in said processor arranged to select, using said memory element, a bridge node from among said plurality of nodes based on said combinations.

15. The apparatus of claim 14 wherein said second determining element is arranged to:
  determine, for said each first node using said processor, a first local sub-metric proportional to said signal flow between said each first node and said each second node and signal flow between said each second node and each third node in said network connected to at least one of said each second node; and,
  determine, for said each first node using said processor, a second local sub-metric proportional to the largest and second largest signal flows from among the respective signal flows between said each first node and said each second node.

16. The apparatus of claim 15 wherein said global metric comprises said signal flow through said each first node divided by said total signal flow, wherein a denominator for said first local sub-metric comprises said signal flow between said each first node and each second node, wherein said second local metric comprises said second largest signal flow divided by said largest signal flow, wherein said calculating element is arranged to calculate a respective product of said global metric and said first and second local sub-metrics for said each first node, and wherein said selecting element is arranged to select said each first node with a highest said respective product.

\* \* \* \* \*

UNITED STATES PATENT AND TRADEMARK OFFICE
CERTIFICATE OF CORRECTION

PATENT NO. : 7,808,921 B2
APPLICATION NO. : 11/804700
DATED : October 5, 2010
INVENTOR(S) : Aidong Zhang et al.

It is certified that error appears in the above-identified patent and that said Letters Patent is hereby corrected as shown below:

Col. 20, claim 1 should read: 1. A method for identifying a bridge node in a network, comprising the steps of:
    determining, for each first node in a plurality of nodes in said network, using a processor in a specially programmed general-purpose computer, a global metric proportional to total signal flow in said network and signal flow through said each first node;

Col. 21, claim 3 should read: 3. A method for identifying a bridge node in a network, comprising the steps of:
    determining, for each first node in a plurality of nodes in said network, using a processor in a specially programmed general-purpose computer, a global metric proportional to total signal flow in said network and signal flow through said each first node;

Col. 21-22, claim 6 should read: 6. A method for identifying a bridge node in a network, comprising the steps of:
    determining, for each first node in a plurality of nodes in said network, using a processor in a specially programmed general-purpose computer, a global metric proportional to a total number of paths connecting node pairs in said network and a total number of said paths connected to said each first node;

Col. 22, claim 9 should read: 9. An apparatus for identifying a bridge node in a network, comprising:
    a first determining element in a processor in a specially programmed general-purpose computer arranged, for each first node in a plurality of nodes in said network, to determine a global metric proportional to total signal flow in said network and signal flow through said each first node;

Col. 23, claim 11 should read: 11. An apparatus for identifying a bridge node in a network, comprising:
    a first determining element in a processor in a specially programmed general-purpose computer arranged, for each first node in a plurality of nodes in said network, to determine a global metric proportional to total signal flow in said network and signal flow through said each first node;

Signed and Sealed this
Twenty-eighth Day of December, 2010

David J. Kappos
*Director of the United States Patent and Trademark Office*

CERTIFICATE OF CORRECTION (continued)
U.S. Pat. No. 7,808,921 B2

Col. 24, claim 14 should read: 14. An apparatus for identifying a bridge node in a network, comprising:

a first determining element in a processor for a specially programmed general-purpose computer arranged, for each first node in a plurality of nodes in said network, to determine a global metric proportional to a total number of paths connecting node pairs in said network and a total number of said paths connected to said each first node;